(12) United States Patent
Yamamoto et al.

(10) Patent No.: US 11,523,053 B2
(45) Date of Patent: Dec. 6, 2022

(54) IMAGE PROCESSING APPARATUS

(71) Applicant: AISIN CORPORATION, Kariya (JP)

(72) Inventors: Kinji Yamamoto, Anjo (JP); Kazuya Watanabe, Anjo (JP); Tetsuya Maruoka, Okazaki (JP); Itsuko Fukushima, Nagoya (JP)

(73) Assignee: AISIN CORPORATION, Kariya (JP)

( * ) Notice: Subject to any disclaimer, the term of this patent is extended or adjusted under 35 U.S.C. 154(b) by 111 days.

(21) Appl. No.: 17/044,446

(22) PCT Filed: Mar. 25, 2019

(86) PCT No.: PCT/JP2019/012578
§ 371 (c)(1),
(2) Date: Oct. 1, 2020

(87) PCT Pub. No.: WO2019/194014
PCT Pub. Date: Oct. 10, 2019

(65) Prior Publication Data
US 2021/0105402 A1  Apr. 8, 2021

(30) Foreign Application Priority Data
Apr. 3, 2018  (JP) .............................. JP2018-071529

(51) Int. Cl.
*G06T 5/50* (2006.01)
*H04N 5/232* (2006.01)
*G06T 5/00* (2006.01)

(52) U.S. Cl.
CPC ......... *H04N 5/23229* (2013.01); *G06T 5/009* (2013.01); *G06T 5/50* (2013.01);
(Continued)

(58) Field of Classification Search
CPC .......... H04N 5/23229; H04N 5/23238; H04N 7/181; G06T 5/009; G06T 5/50;
(Continued)

(56) References Cited

U.S. PATENT DOCUMENTS 8,928,753 B2  1/2015 Han et al.
9,041,807 B2  5/2015 Murakami et al.
(Continued)

FOREIGN PATENT DOCUMENTS

JP  2007067714 A  * 3/2007
JP  2007-141098 A  6/2007
(Continued)

OTHER PUBLICATIONS

International Search Report for PCT/JP2019/012578 dated Jun. 11, 2019 (PCT/ISA/210).

*Primary Examiner* — Matthew C Bella
*Assistant Examiner* — Kathleen M Broughton
(74) *Attorney, Agent, or Firm* — Sughrue Mion, PLLC

(57) ABSTRACT

An image processing apparatus includes a hardware processor configured to: acquire a plurality of pieces of image information including image-capturing regions overlapping partially; to set first and second correction values with a predetermined value, the first correction value being used for correction of luminance of a first region of interest included in a first overlap region in which a first image-capturing region overlaps an adjacent second image-capturing region, the second correction value being used for correction of luminance of a second region of interest included in a second overlap region in which the first image-capturing region overlaps an adjacent third image-capturing region; and to set with the first and second correction values an individual correction value used for correction of luminance of a region (Continued)

between the first region of interest and the second region of interest in the first image-capturing region.

8 Claims, 17 Drawing Sheets

(52) U.S. Cl.
 CPC ........... *G06T 2207/20208* (2013.01); *G06T 2207/20221* (2013.01); *G06T 2207/30252* (2013.01)

(58) Field of Classification Search
 CPC ........... G06T 5/008; G06T 2207/20208; G06T 2207/20221; G06T 2207/30252; G06T 1/00
 See application file for complete search history.

(56) References Cited

U.S. PATENT DOCUMENTS

| | | | |
|---|---|---|---|
| 9,598,105 | B2 | 3/2017 | Sakakibara et al. |
| 2014/0160275 | A1* | 6/2014 | Sakakibara .......... B62D 15/029 348/118 |

FOREIGN PATENT DOCUMENTS

| | | | | |
|---|---|---|---|---|
| JP | 2007141098 | A | * | 6/2007 |
| JP | 2008-028521 | A | | 2/2008 |
| JP | 2009-141490 | A | | 6/2009 |
| JP | 2009141490 | A | * | 6/2009 |
| JP | 5464741 | B2 | | 4/2014 |
| JP | 5684144 | B2 | | 3/2015 |
| JP | 6115104 | B2 | | 4/2017 |

* cited by examiner

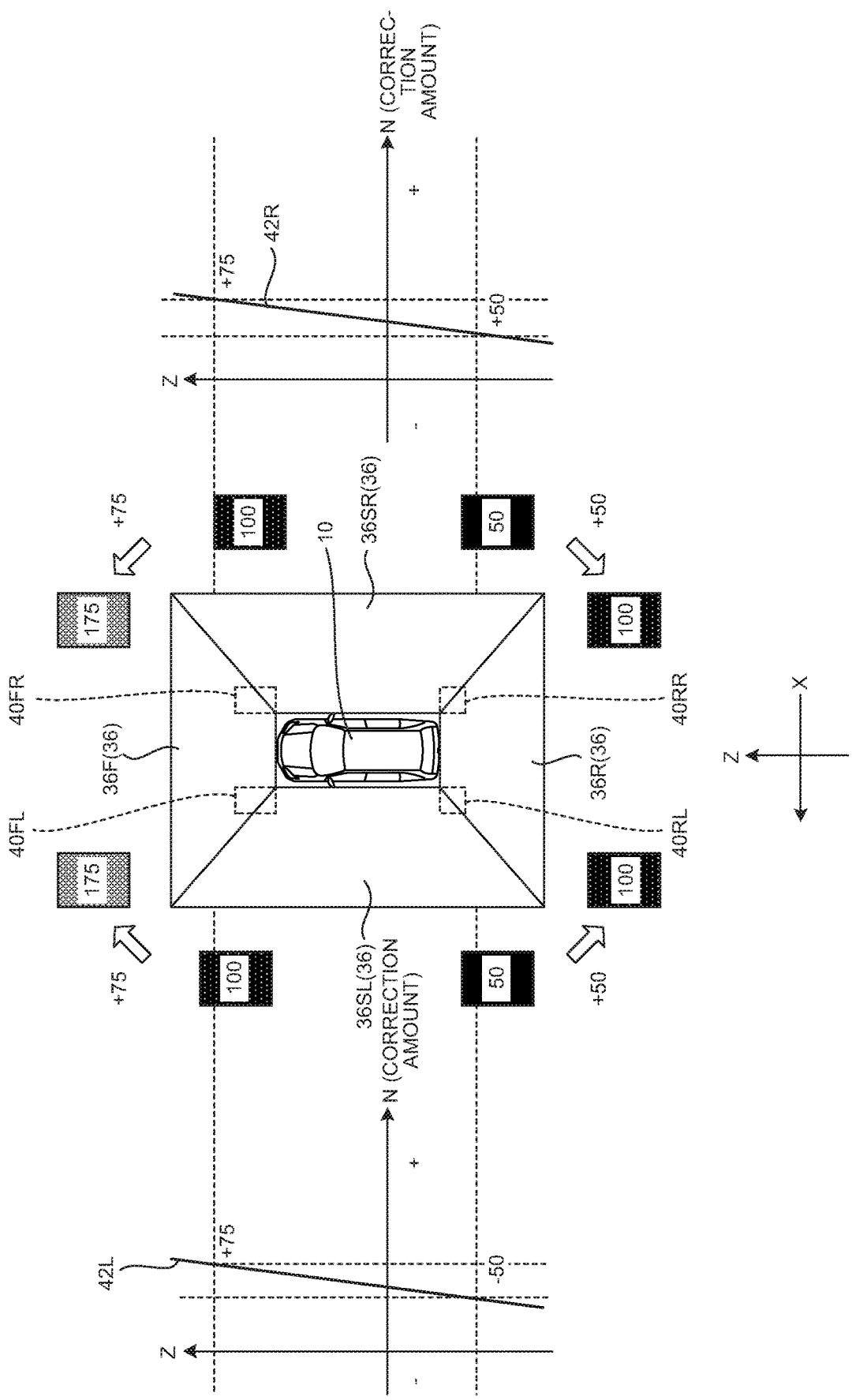

IMAGE PROCESSING APPARATUS

CROSS REFERENCE TO RELATED APPLICATIONS

This application is national stage application of International Application No. PCT/JP2019/012578, filed Mar. 25, 2019, which designates the United States, incorporated herein by reference, and which claims the benefit of priority from Japanese Application No. 2018-071529, filed on Apr. 3, 2018, the entire contents of which are incorporated herein by reference.

TECHNICAL FIELD

An embodiment of the present invention relates to an image processing apparatus.

BACKGROUND ART

There is a conventionally known image processing apparatus that captures, with a plurality of image capturing units (cameras) provided at a vehicle, the ambient condition of the vehicle in different directions, performs image processing to a plurality of captured images (e.g., viewpoint conversion), and additionally generates a surrounding image connecting each image together (e.g., a bird's-eye image). In such an image processing apparatus, difference occurs in brightness (luminance) between respective images captured by the image capturing units, depending on, for example, the installed position or image capturing (shooting) direction of each image capturing unit, the shooting time period, the on-state or off-state of headlights, or the difference in the degree of diaphragm adjustment between the image capturing units. As a result, in some cases, the brightness of a surrounding image generated by connection varies in direction, and the difference in luminance is noticeable at each connected position, resulting in an unnatural image. Thus, there are proposed technologies, such as correction of the luminance of the entire screen, based on the average luminance of a plurality of images, calculation of the average value in luminance of four places in the front image and adjustment in luminance of the other images, and correction in luminance of the side images with the average value in luminance of the front and rear images.

CITATION LIST

Patent Literature

Patent Document 1: JP 5464741 B2
Patent Document 2: JP 5684144 B2
Patent Document 3: JP 6115104 B2

SUMMARY OF INVENTION

Problem to be Solved by the Invention

However, according to the technologies described above, in a case where a reference image is too dark or conversely too bright, the influence thereof is exerted on the correction amount of the luminance of another image. Thus, in some cases, for example, the image is corrected to an entirely dark image or an entirely too bright image. In any of the cases, it is difficult to recognize the image content to be originally displayed (e.g., an object or carriageway markings). Moreover, a proper surrounding image cannot be displayed due to unnaturalness in some cases. Therefore, it is useful to provide an image processing apparatus that facilitates, in a case where a surrounding image connecting a plurality of images together is displayed, recognition of image content and enables reduction of unnaturalness due to the connections between the images.

Means for Solving Problem

An image processing apparatus according to an embodiment of the present invention includes, for example, a hardware processor configured to: acquire a plurality of pieces of image information captured as a surrounding situation of a vehicle by a plurality of image capturing units provided at the vehicle, the plurality of pieces of image information including image-capturing regions overlapping partially; set a first correction value and a second correction value with a predetermined value, the first correction value being used for correction of luminance of a first region of interest included in a first overlap region in which a first image-capturing region overlaps a second image-capturing region, the first image-capturing region being one of a pair of image-capturing regions, of the image-capturing regions, spaced apart across the vehicle, the second image-capturing region being one of a pair of image-capturing regions, of the image-capturing regions, adjacent to the first image-capturing region, and the second correction value being used for correction of luminance of a second region of interest included in a second overlap region in which the first image-capturing region overlaps a third image-capturing region, the third image-capturing region being another of the pair of image-capturing regions adjacent to the first image-capturing region; and set an individual correction value with the first correction value and the second correction value, the individual correction value being used for correction of luminance of a region between the first region of interest and the second region of interest in the first image-capturing region. According to the configuration, for example, the second image-capturing region and the third image-capturing region to be connected to the first image-capturing region are similarly corrected with the predetermined value. Therefore, the second image-capturing region and the third image-capturing region are adjusted in luminance in similar aspects to the first image-capturing region. As a result, the second image-capturing region and the third image-capturing region are smoothly connected to the first image-capturing region. Moreover, the luminance between the first overlap part and the second overlap part is set on the basis of the correction value of the luminance of each overlap part (the first correction value and the second correction value). Thus, the variation in luminance of the part therebetween (intermediate part) is smooth, so that any extremely dark part or any extremely bright part can be inhibited from occurring. As a result, even in a case where a plurality of images is connected, an easily-recognizable surrounding image can be generated.

In the image processing apparatus according to an embodiment of the present invention, for example, the hardware processor may be further configured to perform correction with the first correction value and the second correction value such that the luminance of the first region of interest and the luminance of the second region of interest arrive at a target luminance determined as the predetermined value. According to the configuration, for example, the luminance of the overlap region in which each image is connected is identical to the previously defined target luminance. Thus, the connection between each image is smooth, and the luminance of the intermediate part of each image varies gradually from the target luminance and then varies to the same target luminance. Therefore, the luminance of the intermediate part can be inhibited from deviating considerably from the target luminance. As a result, too bright correction or conversely too dark correction is inhibited, so that an entirely easily-recognizable surrounding image can be generated.

In the image processing apparatus according to an embodiment of the present invention, for example, the hardware processor may be further configured to add an adjustment value determined as the predetermined value to the first and second correction values of the first and second regions of interest that are determined based on at least one of the luminance of the first region of interest and the luminance of the second region of interest. According to the configuration, for example, in a case where the entire image is dark due to a too dark luminance after correction with the determined correction values (the first correction value and the second correction value), use of the adjustment value as the predetermined value enables a uniform increase of the luminance (raising). As a result, a surrounding image can be inhibited from being dark (too dark) entirely.

In the image processing apparatus according to an embodiment of the present invention, for example, when the individual correction value is calculated based on an interpolation formula for linear interpolation between the first correction value and the second correction value, the hardware processor may be further configured to reduce a gradient of the interpolation formula as the gradient increases. According to the configuration, for example, the luminance is inhibited from being adjusted extremely large. Thus, unnatural too bright correction or too dark correction is prevented, so that an easily-recognizable surrounding image can be generated.

In the image processing apparatus according to an embodiment of the present invention, for example, the hardware processor may be further configured to set a correction upper-limit value for the individual correction value and set the individual correction value such that, along with an increase in a correction amount of luminance, the correction amount converges on the correction upper-limit value. According to the configuration, for example, the luminance is inhibited from being adjusted extremely large. Thus, unnatural too bright correction or too dark correction is prevented, so that an easily-recognizable surrounding image can be generated.

In the image processing apparatus according to an embodiment of the present invention, for example, the hardware processor may be further configured to set the individual correction value in accordance with a correction value calculated with a linear interpolation formula including the first correction value and the second correction value. According to the configuration, the load of luminance correction processing can be reduced.

In the image processing apparatus according to an embodiment of the present invention, for example, the hardware processor may be further configured to set the individual correction value in accordance with a correction value calculated with a linear interpolation formula based on a first coefficient of a first γ curve calculated as a curve formula for a first target luminance with respect to the luminance of the first region of interest and a second coefficient of a second γ curve calculated as a curve formula for a second target luminance with respect to the luminance of the second region of interest. According to the configuration, for example, the γ curve formulae each express a curve that must include the minimum luminance value "0" and the maximum luminance value "255" in a case where the luminance is expressed in 256 levels. Thus, use of the respective coefficients of the γ curves enables luminance correction between the minimum luminance value and the maximum luminance value. Thus, black defects (too dark correction) or halation (too bright correction) can be inhibited. As a result, a lack of information due to, for example, black defects or halation, can be inhibited, so that an easily-recognizable surrounding image can be generated.

BRIEF DESCRIPTION OF DRAWINGS

FIG. 20 is an explanatory schematic view of exemplary luminance setting to the side image-capturing regions after luminance setting to the front image-capturing region with the linear interpolation formula after correction in FIG. 19 and luminance setting to the rear image-capturing region with a similar method.

DESCRIPTION OF EMBODIMENTS

An exemplary embodiment of the present invention will be disclosed below. Configurations in the following embodiment and functions, results, and effects due to the configurations are exemplary. The present invention can be achieved with other configurations different from the configurations disclosed in the following embodiment, and at least one of various effects and derivative effects based on a basic configuration can be acquired.

Figure 1:
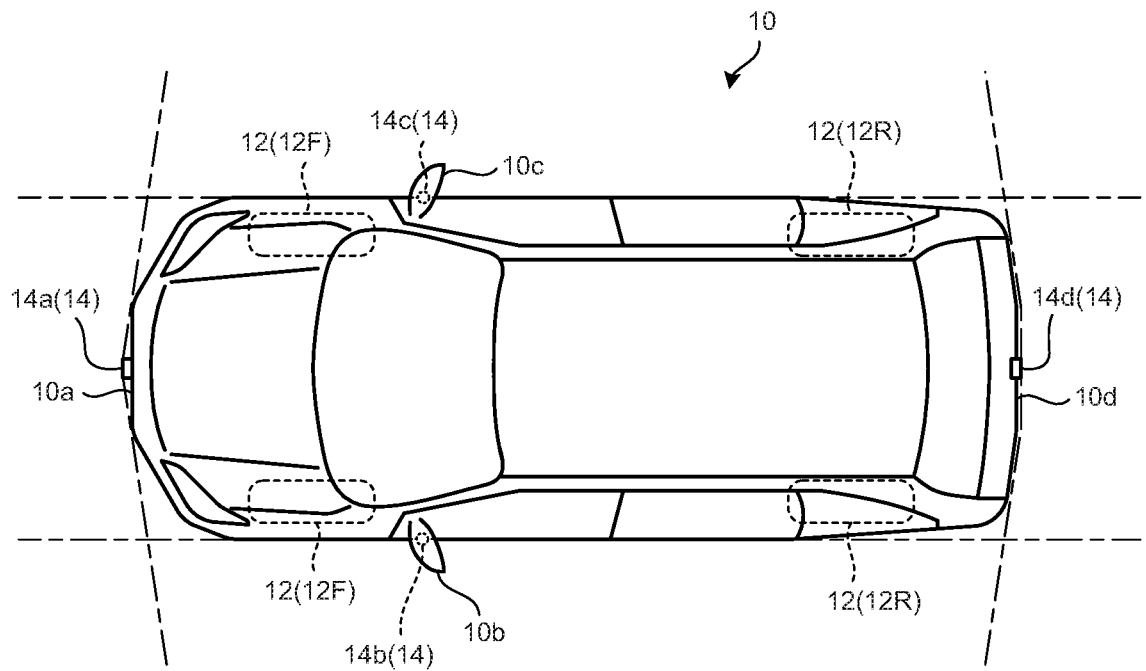
FIG. 1 is a schematic plan view of an exemplary vehicle that can be equipped with an image processing apparatus according to an embodiment.

FIG. 1 is a schematic plan view of a vehicle 10 equipped with an image processing apparatus according to the present embodiment. For example, the vehicle 10 may be an automobile having an internal combustion engine (engine not illustrated) as a driving source (internal-combustion-engine vehicle), an automobile having an electric motor (motor is not illustrated) as a driving source (e.g., an electric vehicle or a fuel cell vehicle), or an automobile having an internal combustion engine and an electric motor as a driving source (hybrid vehicle). Moreover, the vehicle 10 can be equipped with various transmissions and can be equipped with various devices (e.g., systems and components) required for driving an internal combustion engine or an electric motor. Moreover, for example, the system, the number, and the layout of devices related to the drive of wheels 12 (front wheels 12F and rear wheels 12R) in the vehicle 10 can be variously set.

As exemplified in FIG. 1, the vehicle 10 is provided with, for example, four image capturing units 14a to 14d as a plurality of image capturing units 14. The image capturing units 14 each are a digital camera having an image capturing element, such as a charge coupled device (CCD) or a CMOS image sensor (CIS), built therein. The image capturing units 14 each are capable of outputting moving image data (captured image data and image information) at a predetermined frame rate. The image capturing units 14 each have a wide-angle lens or a fisheye lens and are capable of shooting, for example, a range of 140° to 220° (image-capturing region) horizontally. Moreover, the optical axes of the image capturing units 14 are set obliquely downward. Therefore, the image capturing units 14 each successively shoot the external surrounding situation of the vehicle 10 including road surfaces on which the vehicle 10 can move, marks given to the road surfaces (including, for example, arrows, carriageway markings, lines indicating parking space, and traffic-lane separating lines), and objects (e.g., pedestrians and vehicles), to output captured image data.

The image capturing units 14 each are provided at the outer circumferential portion of the vehicle 10. For example, the image capturing unit 14a is provided on the front side of the vehicle 10, namely, at the end portion at substantially the center in the vehicular width direction on the front side in the vehicular length direction, such as a front bumper 10a or a front grille. The image capturing unit 14a is capable of capturing a front image (front image-capturing region) including the front end portion of the vehicle 10 (e.g., the front bumper 10a). Moreover, for example, the image capturing unit 14b is provided at the end portion on the left of the vehicle 10, such as a left door mirror 10b. The image capturing unit 14b is capable of capturing a left side image including a region left lateral to the vehicle 10 (e.g., a region ranging from left front to left rear) (left-side image-capturing region). Moreover, for example, the image capturing unit 14c is provided at the end portion on the right of the vehicle 10, such as a right door mirror 10c. The image capturing unit 14c is capable of capturing a right side image including a region right lateral to the vehicle 10 (e.g., a region ranging from right front to right rear) (right-side image-capturing region). Moreover, the image capturing unit 14d is provided on the rear side of the vehicle 10, namely, at the end portion at substantially the center in the vehicular width direction on the rear side in the vehicular length direction, such as a position above a rear bumper 10d. The image capturing unit 14d is capable of capturing a rear image including the rear end portion of the vehicle 10 (e.g., the rear bumper 10d) (rear image-capturing region).

The image processing apparatus according to the present embodiment performs, on the basis of captured image data acquired by the plurality of image capturing units 14, arithmetic processing or image processing, so that an image having a wider viewing angle can be generated or a virtual image indicating the vehicle 10 viewed from above, front, or side (e.g., a bird's-eye image (plan image), a side-view image, or a front-view image) can be generated. Note that captured image data (image) that each image capturing unit 14 captures is provided with overlap regions due to mutual overlapping, so that no missing region occurs at the time of connection of images. For example, the end region on the left in the vehicular width direction of the captured image data captured by the image capturing unit 14a overlaps with the end region on the front side in the vehicular length direction of the captured image data captured by the image capturing unit 14b. Then, performed is processing of connecting (combining) the two images. Similarly, for the front image and the right side image, the left side image and the rear image, and the rear image and the right side image, an overlap region is provided. For each, performed is processing of connecting (combining) the two images.

Figure 2:
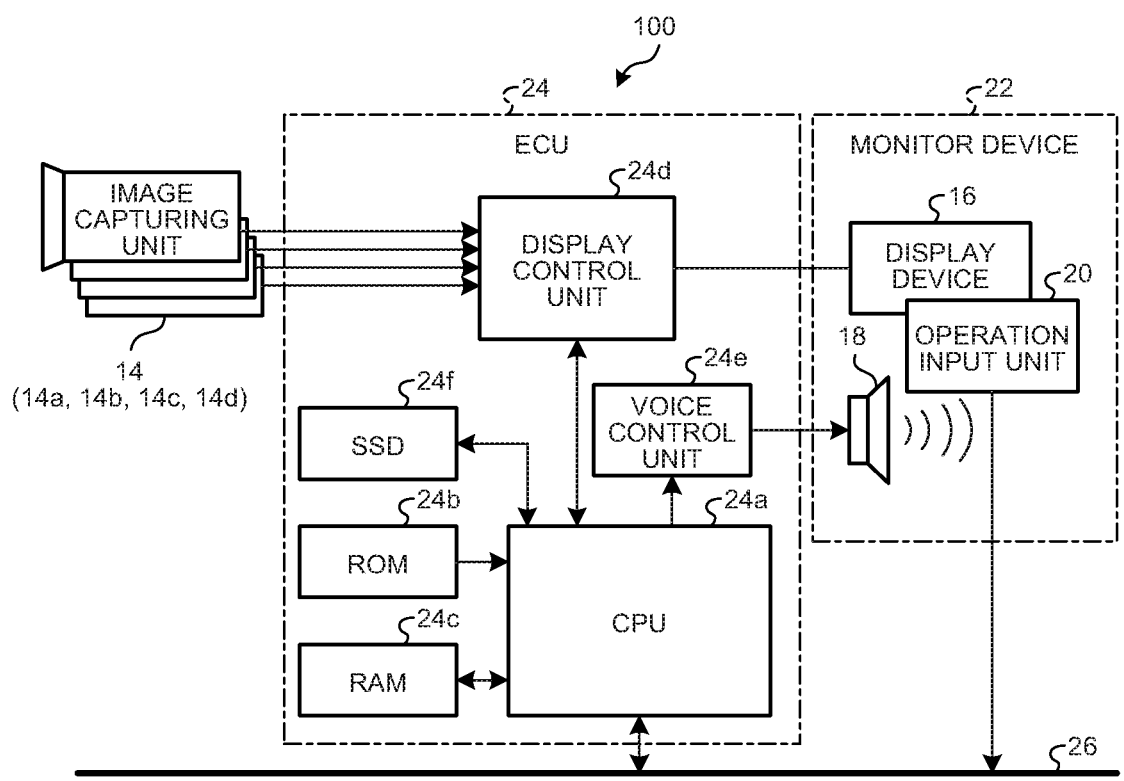
FIG. 2 is a block diagram of an exemplary configuration of an image processing system including the image processing apparatus according to the embodiment.

FIG. 2 is a block diagram of an exemplary configuration of an image processing system 100 including the image processing apparatus with which the vehicle 10 is equipped. The vehicle 10 has a room in which a display device 16 and a voice output device 18 are provided. The display device 16 is, for example, a liquid crystal display (LCD) or an organic electroluminescent display (OELD). The voice output device 18 is, for example, a speaker. Moreover, the display device 16 is covered with a transparent operation input unit 20, such as a touch panel. An occupant (e.g., the driver) can visually identify an image displayed on the display screen of the display device 16 through the operation input unit 20. Moreover, the occupant performs an operation of touching or pressing with a finger or an operation of moving a finger to the operation input unit 20 at the position corresponding to an image displayed on the display screen of the display device 16, so that an operation input can be performed. For example, the display device 16, the voice output device 18, and the operation input unit 20 are provided in a monitor device 22 located at the center portion in the vehicular width direction, namely, the left and right direction of the dashboard of the vehicle 10. The monitor device 22 can include operation input units, such as a switch, a dial, a joystick, and a push button, not illustrated. For example, the monitor device 22 can serve as a navigation system or an audio system.

Moreover, as exemplified in FIG. 2, the image processing system 100 (image processing apparatus) includes an electronic control unit (ECU) 24 in addition to the image capturing units 14 (14a to 14d) and the monitor device 22. In the image processing system 100 (image processing apparatus), the ECU 24 and the monitor device 22 are electrically connected through an in-vehicle network 26 as an electric communication line. For example, the in-vehicle network 26 is provided as a controller area network (CAN). The ECU 24 transmits a control signal through the in-vehicle network 26, so that various types of systems can be controlled. Moreover, through the in-vehicle network 26, the ECU 24 is capable of receiving, for example, respective operation signals from the operation input unit 20 and the various types of switches and respective detection signals from various types of sensors not illustrated.

The ECU 24 transmits a surrounding image generated on the basis of the captured image data acquired from the image capturing units 14 or data regarding voice, to the monitor device 22. The ECU 24 includes, for example, a central processing unit (CPU) 24a, a read only memory (ROM) 24b, a random access memory (RAM) 24c, a display control unit 24d, a voice control unit 24e, and a solid state drive (SSD) 24f including a flash memory.

Figure 3:
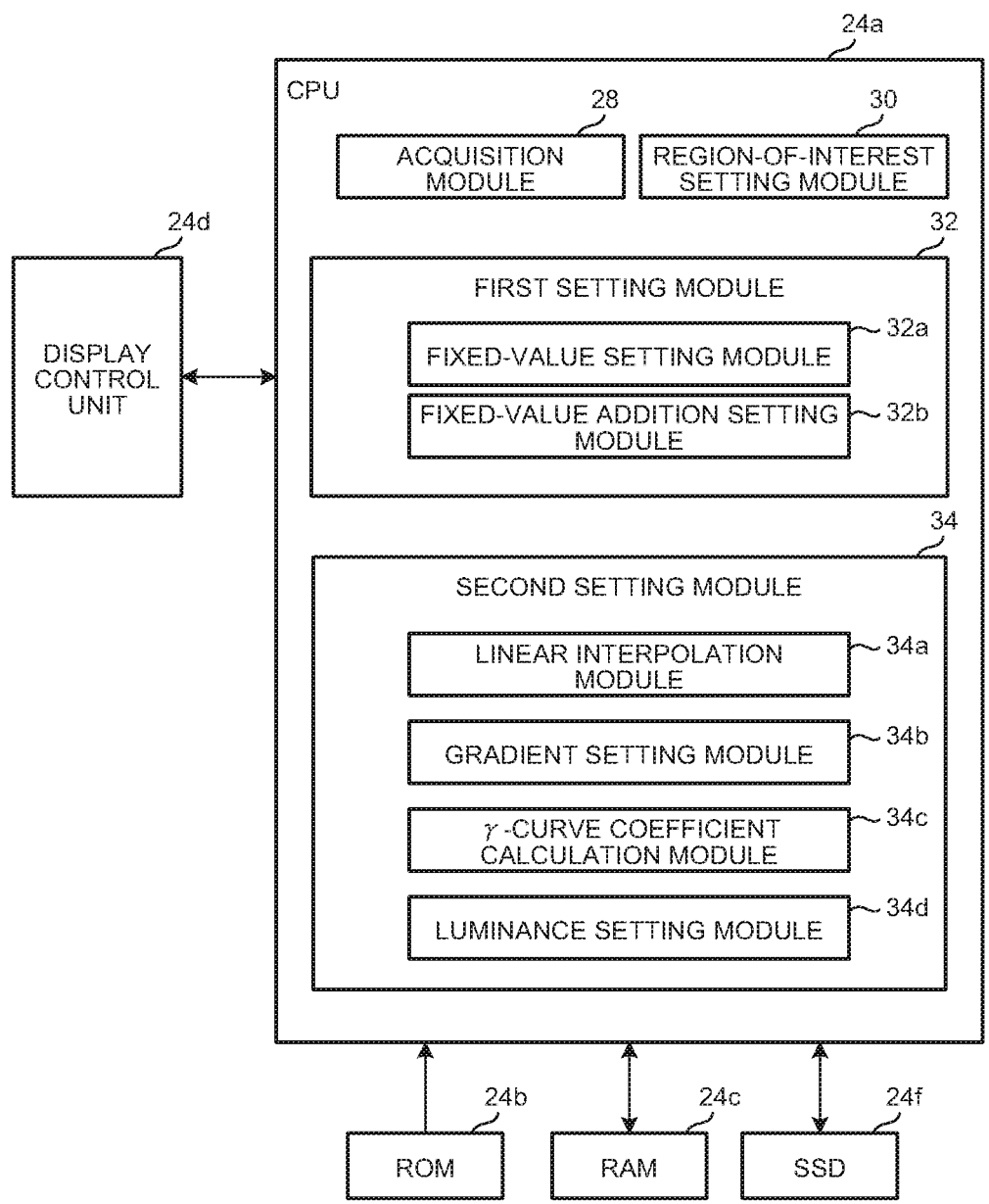
FIG. 3 is a block diagram of an exemplary configuration of a CPU in the image processing apparatus according to the embodiment.

The CPU 24a reads a program stored (installed) in a non-volatile storage device, such as the ROM 24b, and then performs arithmetic processing in accordance with the program. The ROM 24b stores, for example, programs and parameters required for execution of each of the programs. For example, the CPU 24a includes various types of modules as illustrated in FIG. 3 and performs processing associated with an image that the display device 16 displays. For example, the CPU 24a performs, as exemplary processing, correction processing, arithmetic processing, and image processing to the captured image data captured by the image capturing units 14, to generate a surrounding image connecting a plurality of images together (e.g., a bird's-eye image). The details of the CPU 24a will be described later.

The RAM 24c temporarily stores various types of data for use in computation by the CPU 24a. Moreover, in the arithmetic processing by the ECU 24, the display control unit 24d mainly performs, for example, data conversion to an image for display to be displayed by the display device 16. Moreover, in the arithmetic processing by the ECU 24, the voice control unit 24e mainly performs, for example, processing to voice data to be output by the voice output device 18. The SSD 24f is a rewritable non-volatile storage unit and is capable of storing data even in a case where the power to the ECU 24 is turned off. Note that, for example, the CPU 24a, the ROM 24b, and the RAM 24c can be integrally formed in the same package. Moreover, the ECU 24 may include, instead of the CPU 24a, a different arithmetic logic processor, such as a digital signal processor (DSP), or a logic circuit. Moreover, instead of the SSD 24f, a hard disk drive (HDD) may be provided. The SSD 24f or the HDD may be provided separately from the ECU 24.

According to the present embodiment, with cooperation between hardware and software (control program), the ECU 24 conducts image generation processing to an image to be displayed by the display device 16. The ECU 24 performs image processing, such as image luminance correction, to the captured image data (images) captured by the image capturing units 14, at the time of display through the display device 16 after, for example, viewpoint conversion processing. In a case where the front, rear, left, and right images are connected together, the ECU 24 inhibits deterioration in inter-image continuity due to difference in luminance or inhibits the image from being partially or entirely too bright or too dark, resulting in inhibition of the entire image (a surrounding image or a bird's-eye image generated by connection) from deteriorating in visibility.

FIG. 3 is a block diagram of an exemplary configuration for achievement of image processing according to the present embodiment in the CPU 24a included in the ECU 24. Note that, in the CPU 24a, omitted is any configuration not for performance of the image processing according to the present embodiment. The CPU 24a includes various types of modules for performance of the image processing including luminance correction as described above. The CPU 24a reads a program installed and stored in a storage device, such as the ROM 24b, and executes the program, resulting in achievement of the various types of modules. For example, as illustrated in FIG. 3, the CPU 24a includes an acquisition module 28, a region-of-interest setting module 30, a first setting module 32 (first setting module), and a second setting module 34 (second setting module). Moreover, the first setting module 32 includes, for example, a fixed-value setting module 32a and a fixed-value addition setting module 32b. Moreover, the second setting module 34 includes, for example, a linear interpolation module 34a, a gradient setting module 34b, a γ-curve coefficient calculation module 34c, and a luminance setting module 34d.

Figure 4:
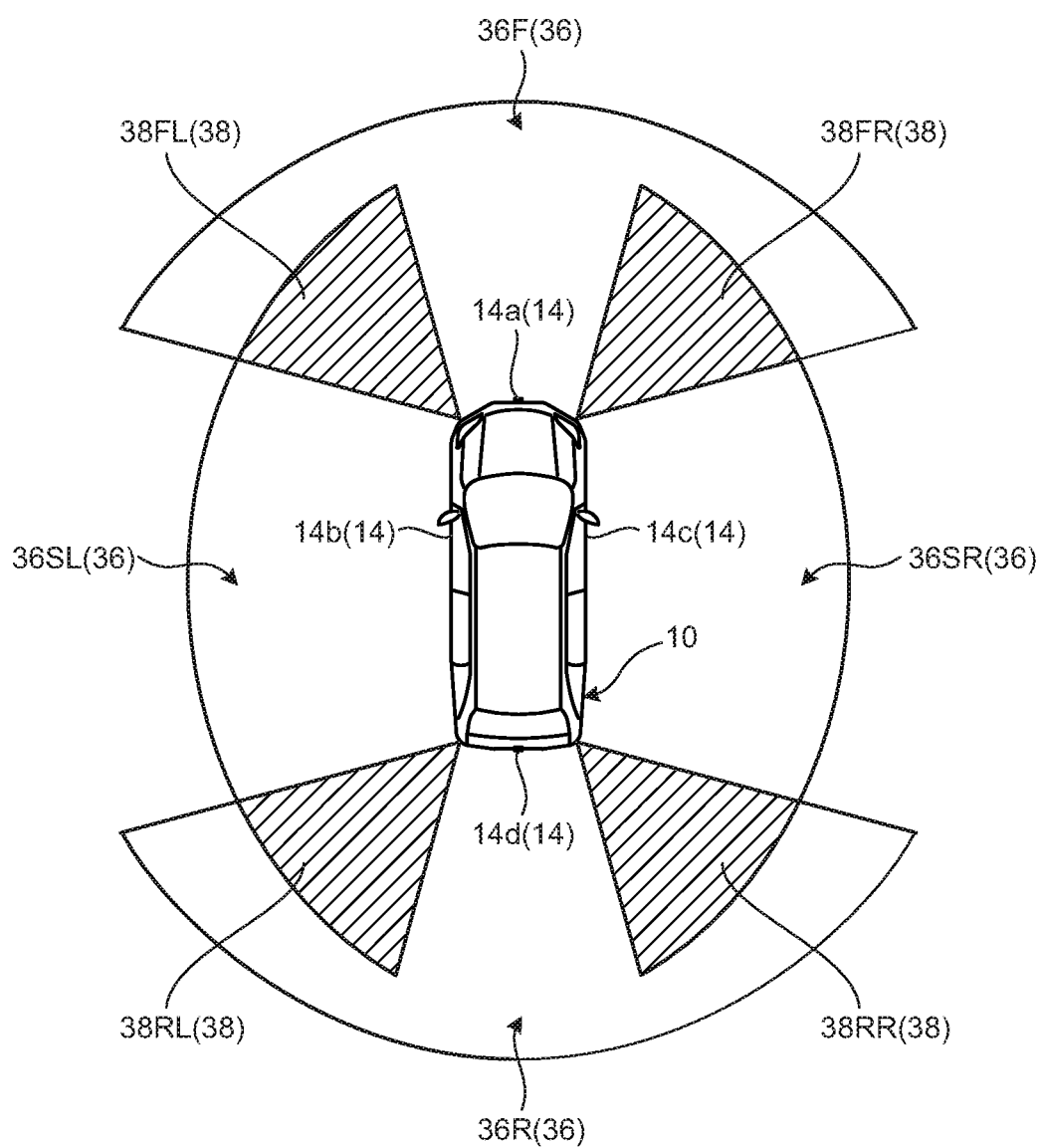
FIG. 4 is an explanatory schematic bird's eye view of respective image-capturing regions that image capturing units capture and the overlap regions thereof.

The acquisition module 28 acquires respective images captured by the image capturing units 14 through the display control unit 24d. The image capturing units 14 (14a to 14d) each are capable of capturing a image-capturing region 36 as illustrated in FIG. 4. Then, each image-capturing region 36 includes overlap regions 38 at which the image-capturing region 36 overlaps partially with the adjacent image-capturing regions 36 as described above. Among the image-capturing regions 36, an overlap region 38FL is formed on the left in the vehicular width direction of an image-capturing region 36F ahead of the vehicle 10 and on the vehicular front side of an image-capturing region 36SL left lateral to the vehicle 10. Among the image-capturing regions 36, an overlap region 38RL is formed on the vehicular rear side of the image-capturing region 36SL and on the left in the vehicular width direction of an image-capturing region 36R behind the vehicle 10. Among the image-capturing regions 36, an overlap region 38RR is formed on the right in the vehicular width direction of the image-capturing region 36R and on the vehicular rear side of an image-capturing region 36SR right lateral to the vehicle 10. Then, among the image-capturing regions 36, an overlap region 38FR is formed on the vehicular front side of the image-capturing region 36SR and on the right in the vehicular width direction of the image-capturing region 36F. The captured image data captured by each image capturing unit 14 may be accompanied with the identification sign of the corresponding image capturing unit 14, for output to the acquisition module 28. Alternatively, an identification sign for identifying an output source may be accompanied every piece of captured image data acquired on the acquisition module 28 side.

Note that, according to the present embodiment, for example, in a case where processing focusing on the image-capturing region 36F is performed, in some cases, one (e.g., the image-capturing region 36F) of a pair of image-capturing regions 36 (e.g., the image-capturing region 36F and the image-capturing region 36R) spaced apart across the vehicle 10 is referred to as a first image-capturing region. Moreover, in some cases, one (e.g., the image-capturing region 36SL) of the pair of image-capturing regions 36 (e.g., the image-capturing region 36SL and the image-capturing region 36SR) adjacent to the first image-capturing region is referred to as a second image-capturing region. Then, in some cases, the overlap region 38 (overlap region 38FL) at which the first image-capturing region and the second image-capturing region overlap, is referred to as a first overlap region. Similarly, in some cases, the other of the pair of image-capturing regions 36 (e.g., the image-capturing region 36SL and the image-capturing region 36SR) adjacent to the first image-capturing region, is referred to as a third image-capturing region (e.g., the image-capturing region 36SR). Then, in some cases, the overlap region 38 (overlap region 38FR) at which the first image-capturing region and the third image-capturing region overlap, is referred to as a second overlap region. Note that, as the pair of image-capturing regions 36 spaced apart across the vehicle 10, for example, the image-capturing region 36SL and the image-capturing region 36SR can be selected. In this case, the second image-capturing region is one of the image-capturing region 36F and the image-capturing region 36R, and the third image-capturing region is the other.

Figure 5:
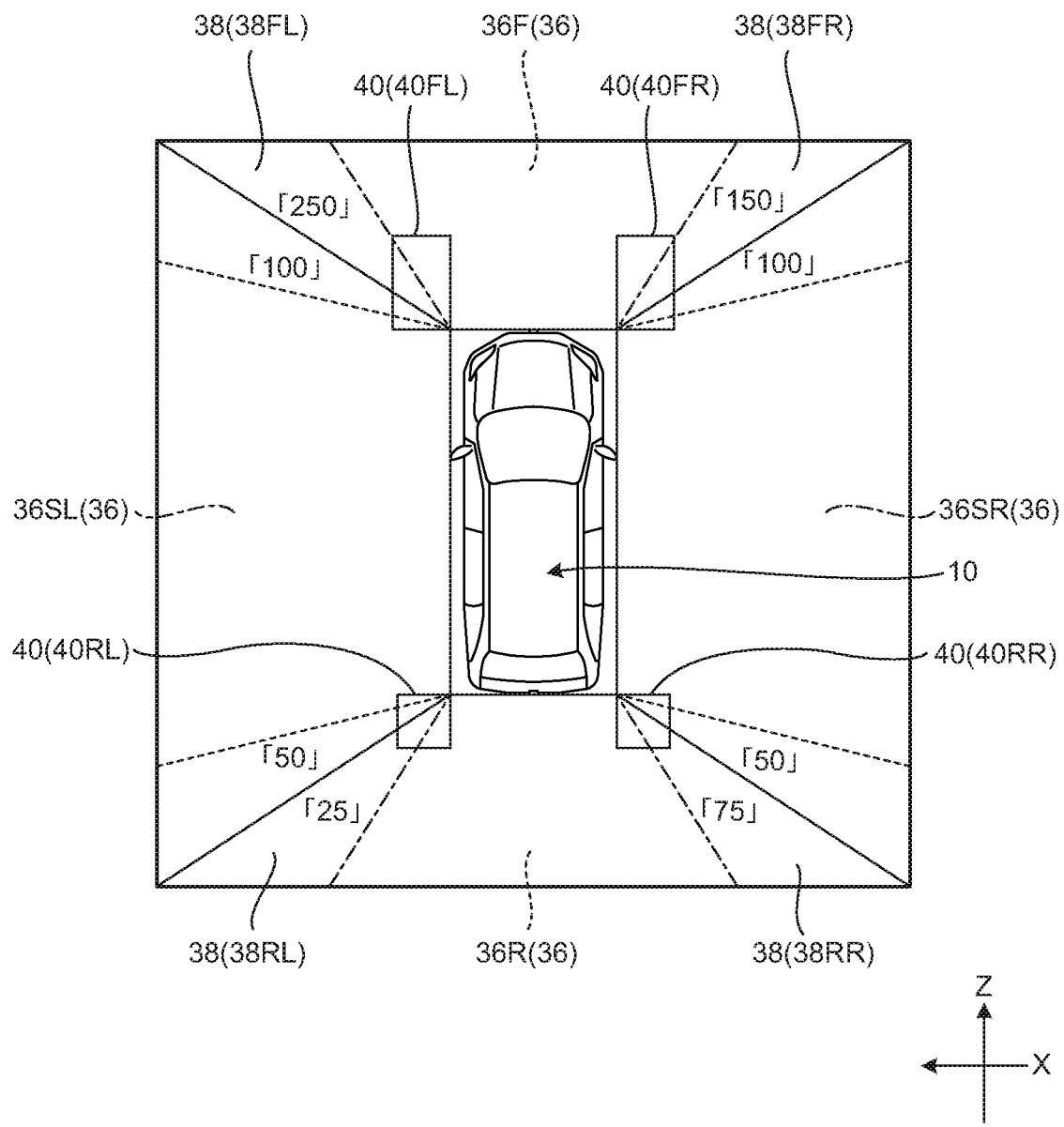
FIG. 5 is a schematic view of an exemplary luminance distribution of the original image to be processed by the image processing apparatus according to the embodiment and exemplary set positions of regions of interest (ROI).

As illustrated in FIG. 5, the region-of-interest setting module 30 sets regions of interest 40 (40FL, 40RL, 40RR, and 40FR) to be referred to at the time of luminance adjustment, one-to-one to the overlap regions 38 of the image-capturing regions 36 acquired by the acquisition module 28. The regions of interest 40 each are, for example, a rectangular region having respective predetermined lengths in the vehicular width direction and length direction of the vehicle 10. The luminance of each region of interest 40 is, for example, the average value in luminance of pixels included in the corresponding region of interest 40. Moreover, in a case where the position of each region of interest 40 is specified in the present embodiment, the position is, for example, the center position of the corresponding region of interest 40 (midpoint in the vehicular width direction and length direction).

Note that each image capturing unit 14 automatically performs diaphragm adjustment (gain adjustment) at the time of capturing, so that brightness adjustment (luminance adjustment) is performed to the corresponding image-capturing region 36. As a result, in a case where a large number of bright regions are present in a image-capturing region 36, the f number rises, so that a darkish image restrained in brightness is captured. Conversely, in a case where a large number of dark regions are present in a image-capturing region 36, the f number drops, so that a brightish image improved in brightness is captured. Therefore, as illustrated in FIG. 5, for example, in the region of interest 40FL included in the overlap region 38FL, in some cases, the part corresponding to the region of interest 40FL on the image-capturing region 36F side and the part corresponding to the region of interest 40FL on the image-capturing region 36SL side are different in brightness (luminance). For example, in FIG. 5, the luminance is expressed in 256 levels of 0 to 255 ("0" represents dark and "255" represents bright). For example, for the region of interest 40FL included in the overlap region 38FL, the luminance on the image-capturing region 36F side is bright with "250", and the luminance on the image-capturing region 36SL side is darker with "100" than that on the image-capturing region 36F side. Note that, in FIG. 5, the number "100" or the like indicates the luminance. Moreover, in other figures, in some cases, the number in each region of interest 40 indicates the luminance. Note that the region-of-interest setting module 30 may set the set position of each region of interest 40 to a previously defined position, or may change the set position in accordance with the luminance distribution of each image-capturing regions 36.

The first setting module 32 corrects the luminance of each region of interest 40 with a predetermined value. For example, considered is the first image-capturing region (e.g., the image-capturing region 36F) that is one of a pair of image-capturing regions 36 spaced apart across the vehicle 10 (e.g., the image-capturing region 36F and the image-capturing region 36R). The first setting module 32 corrects the luminance of the first region of interest (e.g., the region of interest 40FL) included in the first overlap region (e.g., the overlap region 38FL) at which the first image-capturing region (e.g., the image-capturing region 36F) overlaps with the second image-capturing region (e.g., the image-capturing region 36SL) that is one of the pair of image-capturing regions 36 adjacent to the first image-capturing region. Similarly, the first setting module 32 corrects the luminance of the second region of interest (region of interest 40FR) included in the second overlap region (e.g., the overlap region 38FR) at which the first image-capturing region (e.g., the image-capturing region 36F) overlaps with the third image-capturing region (e.g., the image-capturing region 36SR) that is the other image-capturing region 36 adjacent to the first image-capturing region. Similarly, the first setting module 32 corrects the luminance of the region of interest 40RL and the luminance of the region of interest 40RR.

According to the present embodiment, the first setting module 32 can correct the luminance of each region of interest 40 with a predetermined value, for example, with two types of methods. For example, the fixed-value setting module 32a determines a correction value for satisfaction of the target luminance determined as a predetermined value, and performs luminance correction. The fixed-value setting module 32a performs correction with a correction value for causing the luminance of each region of interest 40 to be identical to the target luminance (e.g., "200" in 256 levels) that is derived in advance, for example, by experiment and enables the best visibility regardless of the ambient bright and dark environments.

Moreover, in a case where the target luminance for correction of the luminance of each region of interest 40 included in a image-capturing region 36 is calculated, the fixed-value addition setting module 32b included in the first setting module 32 adds an adjustment value determined as a predetermined value to the target luminance, to uniformly raise and correct the luminance of the image-capturing region 36. For example, for the image-capturing region 36F, in a case where the luminance of the region of interest 40FL on the left in the vehicular width direction is "150" and the region of interest 40FR on the right in the vehicular width direction is "100", the target luminance is determined with at least either luminance. For example, the average luminance "125" of the region of interest 40FL and the region of interest 40FR is set as the target luminance. Although correction is performed with the target luminance, in a case where it is determined that the brightness of the entirety of the image-capturing region 36F is insufficient, the adjustment value determined as the predetermined value is added. For example, addition is performed with the "adjustment luminance value=50" that is the adjustment value determined in advance by experiment, to uniformly raise the brightness of the entirety of the image-capturing region 36F. Note that specific exemplary corrections of the fixed-value setting module 32a and the fixed-value addition setting module 32b will be described later.

On the basis of the respective correction values to adjacent regions of interest 40, the second setting module 34 sets the luminance therebetween. For example, in a case where the region of interest 40FL on the left in the vehicle width direction of the image-capturing region 36F is defined as the first region of interest, for example, the correction value for correction to the fixed target luminance set by the fixed-value setting module 32a is defined as the first correction value. Similarly, in a case where the region of interest 40FR on the right in the vehicular width direction of the image-capturing region 36F is defined as the second region of interest, for example, the correction value for correction to the fixed target luminance set by the fixed-value setting module 32a is defined as the second correction value. In this case, with the first correction value and the second correction value, the linear interpolation module 34a generates, for example, a linear interpolation formula for linear interpolation (straight line connecting the first correction value and the second correction value). Then, on the basis of the generated linear interpolation formula (e.g., the linear interpolation formula), corrected is the luminance of the region between the two regions of interest 40.

In a case where the gradient of the linear interpolation formula generated by the linear interpolation module 34a is a predetermined limit value or more, the gradient setting module 34b corrects the gradient of the linear interpolation formula. For example, in a case where the luminance of one of the adjacent regions of interest 40 deviates considerably from the target luminance set by the fixed-value setting module 32a, the gradient of the linear interpolation formula generated by the linear interpolation module 34a is large. As a result, for example, around either region of interest 40, in some cases, a part darker than the corresponding region of interest 40 is corrected more brightly due to the influence of correction of the luminance of the corresponding region of interest 40. As a result, correction is performed to make the luminance higher than necessary, in some cases, so that so-called "halation" occurs. With a previously set curve, the gradient setting module 34b corrects the gradient of the linear interpolation formula generated by the linear interpolation module 34a. For example, the curve has a characteristic of causing no correction in a case where the gradient of the linear interpolation formula is smaller than the limit value and a characteristic of causing correction of reducing the gradient in a case where the gradient is the predetermined limit value or more. Note that the curve may have a characteristic of causing the gradient to be identical to a previously set predetermined value (fixed value) in a case where the gradient is not less than a threshold limit value larger than the limit value.

Exemplarily, the linear interpolation module 34a connects the respective correction values to adjacent two regions of interest 40, linearly, to generate a linear interpolation formula. In this case, depending on the correction values, in luminance correction to the intermediate part, a too small correction amount causes "black defects" in the image or conversely a too large correction amount causes "halation" in the image. Thus, the γ-curve coefficient calculation module 34c calculates a first coefficient of a first γ curve calculated as a curve formula for the first target luminance to the luminance of the first region of interest (e.g., the region of interest 40FL). Similarly, the γ-curve coefficient calculation module 34c calculates a second coefficient of a second γ curve calculated as a curve formula for the second target luminance to the second region of interest (e.g., the region of interest 40FR). Then, the γ-curve coefficient calculation module 34c generates a linear interpolation formula (linear interpolation formula) based on the calculated first coefficient and second coefficient, and sets the luminance of the region between the first region of interest and the second region of interest, in accordance with a correction value (γ-curve coefficient) calculated with the linear interpolation formula. In this case, the γ curve formulae each express a curve that must include the minimum luminance value "0" and the maximum luminance value "255" in a case where the luminance is expressed in 256 levels. Thus, use of the respective coefficients of the γ curves enables black defects (too dark correction) or halation (too bright correction) to barely occur in the image. As a result, a lack of information due to, for example, black defects or halation, can be inhibited, so that an easily-recognizable surrounding image can be generated.

On the basis of the linear interpolation formula (e.g., a linear interpolation formula) generated by the linear interpolation module 34a, the luminance setting module 34d sets an individual correction value for correction of the luminance of the region between the first region of interest (e.g., the region of interest 40FL) and the second region of interest (e.g., the region of interest 40FR). In a case where the linear interpolation formula generated by the linear interpolation module 34a is a linear interpolation formula regarding the image-capturing region 36F ahead of the vehicle 10, in accordance with the linear interpolation formula, similarly, the luminance setting module 34d performs luminance correction to the region in the vehicular length direction of the image-capturing region 36F. Therefore, for the image-capturing region 36F, the region in the vehicular length direction is subjected to luminance correction with a similar correction value (correction amount).

The configuration of the CPU 24a of FIG. 3 is exemplary. Thus, for example, for correction with a predetermined value, either the fixed-value setting module 32a or the fixed-value addition setting module 32b may be selected from the first setting module 32. Moreover, in a case where one of the fixed-value setting module 32a and the fixed-value addition setting module 32b is used fixedly, the other may be omitted. Moreover, in a case where only the linear interpolation module 34a forms a linear interpolation formula with the correction values of regions of interest 40, the γ-curve coefficient calculation module 34c may be omitted from the second setting module 34.

Exemplary processing of the image processing system 100 (image processing apparatus) having the configuration as above, will be described with FIGS. 7 to 16 in addition to the flowchart of FIG. 6 and FIGS. 1 to 5.

Figure 6:
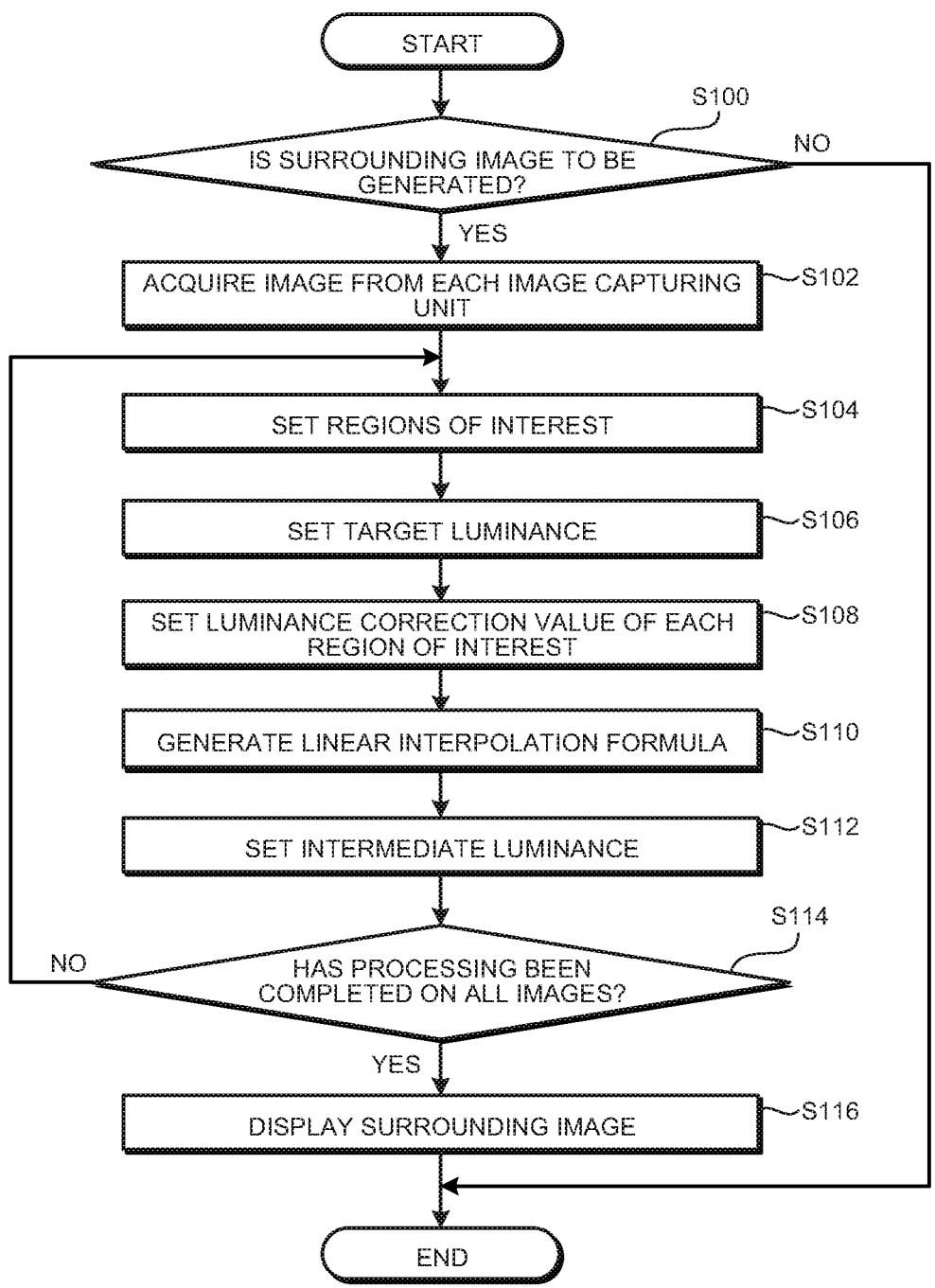
FIG. 6 is an explanatory flowchart of an exemplary flow of processing in a case where luminance correction is performed with a fixed target luminance, in the image processing apparatus according to the embodiment.

With the flowchart of FIG. 6, described will be luminance correction that is performed in a case where the fixed-value setting module 32a sets a previously set target luminance as a predetermined value.

First, the CPU 24a determines whether the present time is the timing of generation of a bird's eye surrounding image based on the vehicle 10 (S100). The determination of the CPU 24a results in being affirmative, for example, on the basis of the operation state of the vehicle 10 (e.g., a case where the shift lever is moved to the position of reverse driving) or a display request operation from the driver through the operation input unit 20. In a case where the CPU 24a determines that the surrounding image is to be generated (Yes in S100), the acquisition module 28 acquires an image (image information) of the image-capturing region 36 captured by each image capturing unit 14 (S102). Note that, in a case where it is determined that the present time is not the timing of generation of the surrounding image (No in S100), the flow of FIG. 6 finishes temporarily.

Figure 7:
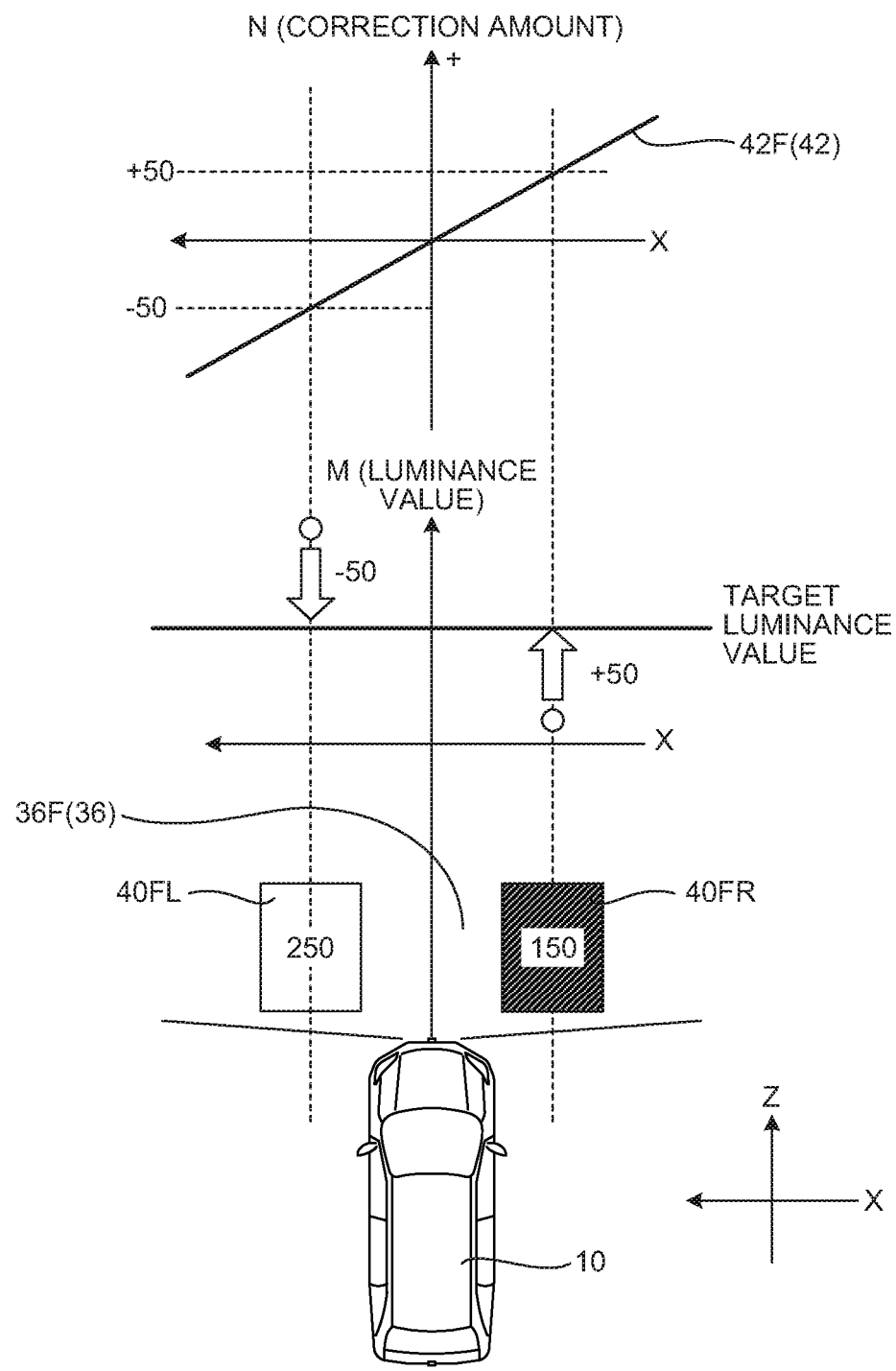
FIG. 7 is an explanatory view of exemplary partial processing of the image processing apparatus according to the embodiment and is a schematic view of correction of the luminance of each region of interest in the image-capturing region ahead of the vehicle, to the fixed target luminance and a linear interpolation formula corresponding to the correction.

Subsequently, the region-of-interest setting module 30 sets regions of interest 40 with respect to the image-capturing region 36 of each acquired image (S104). In a case where the luminance of each region of interest 40 of each image-capturing region 36 is, for example, as illustrated in FIG. 5, the fixed-value setting module 32a sets the target luminance determined as a predetermined value (e.g., "200" in 256 levels) with respect to each region of interest 40 (S106), and sets a correction value for correction of the luminance of each region of interest 40 to the target luminance (e.g., "200") (S108). FIG. 7 illustrates exemplary correction of the luminance of the image-capturing region 36F ahead of the vehicle 10. For the image-capturing region 36F, exemplarily, the luminance of the region of interest 40FL on the left in the vehicular width direction (X-axis direction) is "250" in 256 levels, and the luminance of the region of interest 40FR on the right in the vehicular width direction is "150" in 256 levels. Meanwhile, in a case where the target luminance set by the fixed-value setting module 32a is "200" in 256 levels, a correction value of "−50" as a luminance value M is set to the region of interest 40FL and a correction value of "+50" as a luminance value M is set to the region of interest 40FR in the image-capturing region 36F.

Figure 8:
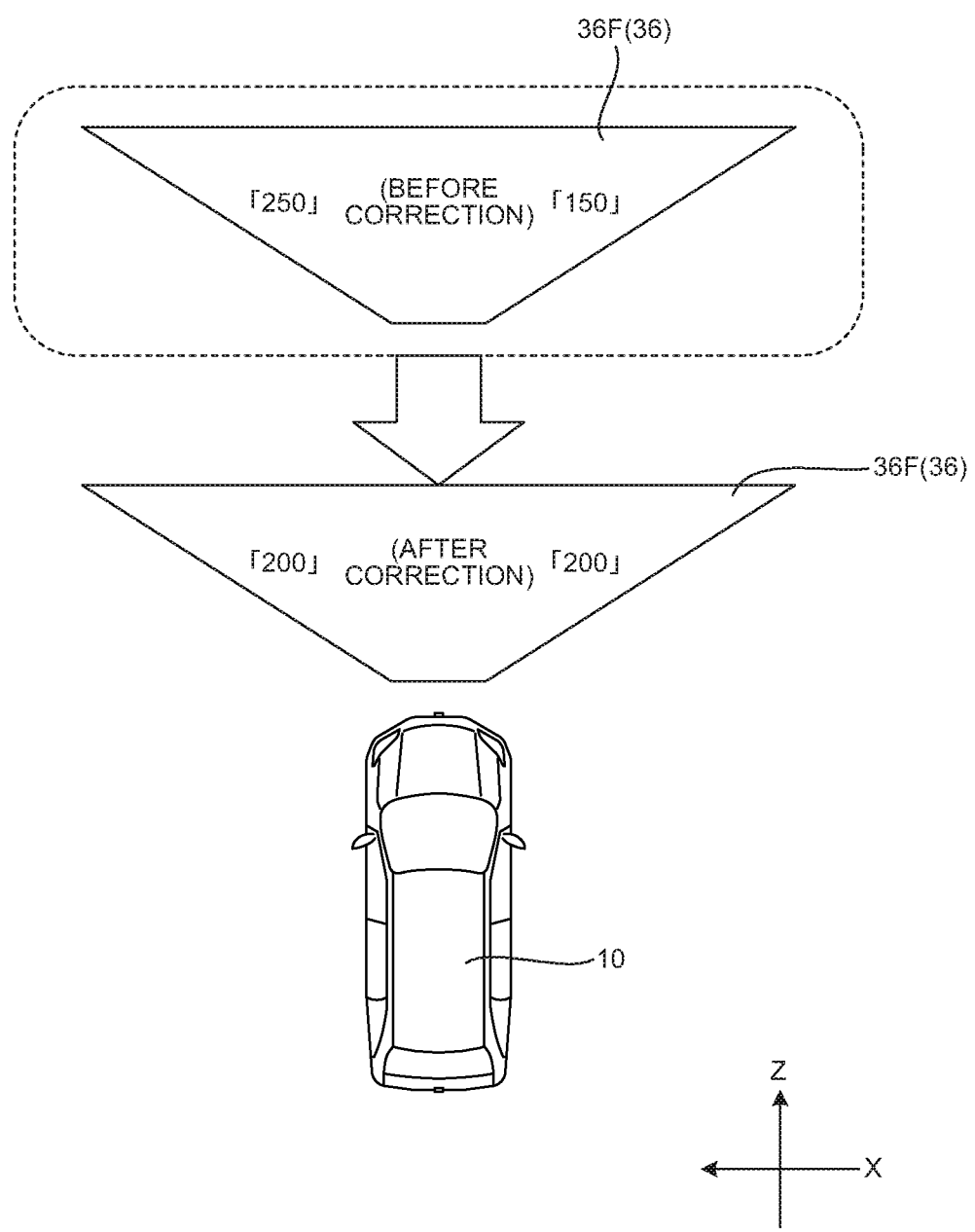
FIG. 8 is an explanatory view of a case where correction is performed with the luminance set with the linear interpolation formula of FIG. 7 and is a schematic view of an exemplary variation in the luminance state before and after correction of the image-capturing region ahead of the vehicle.

The linear interpolation module 34a generates a linear interpolation formula 42 (42F), with the correction value (N=−50) of the region of interest 40FL and the correction value (N=+50) of the region of interest 40FR set by the first setting module 32 (S110). As a result, the linear interpolation formula 42F indicates the correction amount of the luminance in the vehicular width direction (X-axis direction) between the region of interest 40FL and the region of interest 40FR. Then, on the basis of the correction value (individual correction value) calculated with the generated linear interpolation formula 42F, the luminance setting module 34d corrects (sets) the luminance of the region between the region of interest 40FL and the region of interest 40FR. Similarly, the luminance of the region in the vehicular length direction (Z-axis direction) of the image-capturing region 36F is set (corrected) with a similar correction value (S112). As a result, as illustrated in FIG. 8, the image-capturing region 36F before correction is corrected such that the luminance (of the part of the region of interest 40FL) on the left in the vehicular width direction drops, for example, from "250" to "200" and the luminance (of the part of the region of interest 40FR) on the right in the vehicular width direction rises, for example, from "150" to "200".

The CPU 24a monitors whether or not such correction processing has been completed on the entire screen (S114). Then, in a case where the correction processing has not been completed (No in S114), the processing goes back to S104. The region-of-interest setting module 30, the first setting module 32, and the second setting module 34 perform the processing described above to the image-capturing region 36R, the image-capturing region 36SL, and the image-capturing region 36SR.

For example, the region-of-interest setting module 30, the first setting module 32, and the second setting module 34 perform processing similar to that described above, to the image-capturing region 36R behind the vehicle 10. As a result, the image-capturing region 36R before correction is corrected such that the luminance (of the part of the region of interest 40RL) on the left in the vehicular width direction rises from "50" to "200" and the luminance (of the part of the region of interest 40RR) on the right in the vehicular width direction rises "50" to "200".

Figure 9:
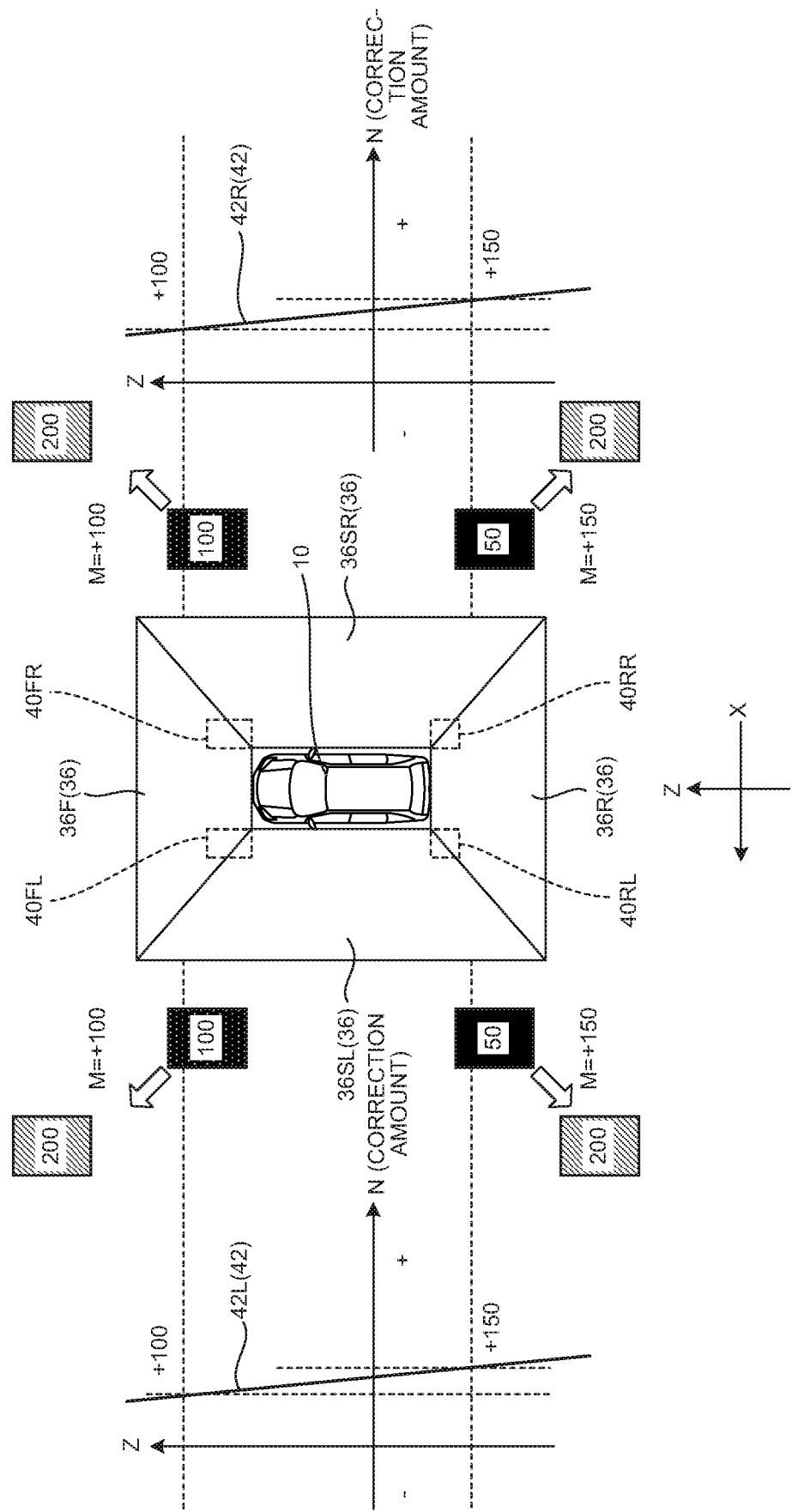
FIG. 9 is an explanatory view of exemplary partial processing of the image processing apparatus according to the embodiment and is a schematic view of correction of the luminance of the regions of interest of each image-capturing region lateral to the vehicle, to the fixed target luminance and a linear interpolation formula corresponding to the correction.

Similarly, as illustrated in FIG. 9, the region-of-interest setting module 30, the first setting module 32, and the second setting module 34 perform similar processing to the image-capturing region 36SL left lateral to the vehicle 10 and the image-capturing region 36SR right lateral to the vehicle 10. For example, for the image-capturing region 36SL, the luminance of the region of interest 40FL on the front side in the vehicular length direction (Z-axis direction) is "100" in 256 levels, and the luminance of the region of interest 40RL on the rear side is "50" in 256 levels. Meanwhile, in a case where the target luminance set by the fixed-value setting module 32a is "200" in 256 levels, the first setting module 32 sets a correction value of "+100" as a luminance value M to the region of interest 40FL and sets a correction value of "+150" as a luminance value M to the region of interest 40RL on the rear side. The linear interpolation module 34a generates a linear interpolation formula 42L, with the correction value (N=+100) of the region of interest 40FL and the correction value (N=+150) of the region of interest 40RL set by the first setting module 32. Similarly, for the image-capturing region 36SR, the luminance of the region of interest 40FR on the front side in the vehicular length direction (Z-axis direction) is "100" in 256 levels and the luminance of the region of interest 40RR on the rear side is "50" in 256 levels. Meanwhile, in a case where the target luminance set by the fixed-value setting module 32a is "200" in 256 levels, the first setting module 32 sets a correction value of "+100" as a luminance value M to the region of interest 40FR and sets a correction value of "+150" as a luminance value M to the region of interest 40RR on the rear side. The linear interpolation module 34a generates a linear interpolation formula 42R, with the correction value (N=+100) of the region of interest 40FR and the correction value (N=+150) of the region of interest 40RR set by the first setting module 32.

As a result, the linear interpolation formula 42L indicates the correction amount of the luminance in the vehicular length direction (Z-axis direction) between the region of interest 40FL and the region of interest 40RL in the image-capturing region 36SL. The linear interpolation formula 42R indicates the individual correction amount of the luminance in the vehicular length direction (Z-axis direction) between the region of interest 40FR and the region of interest 40RR in the image-capturing region 36SR. Then, on the basis of the linear interpolation formula 42L, the luminance setting module 34d corrects, with similar individual correction amounts, the luminance of the region between the region of interest 40FL and the region of interest 40RL and the luminance of the region in the vehicular width direction (X-axis direction) of the image-capturing region 36SL. Moreover, on the basis of the linear interpolation formula 42R, the luminance setting module 34d corrects, with similar individual correction amounts, the luminance of the region between the region of interest 40FR and the region of interest 40RR and the luminance of the region in the vehicular width direction (X-axis direction) of the image-capturing region 36SR.

Figure 10:
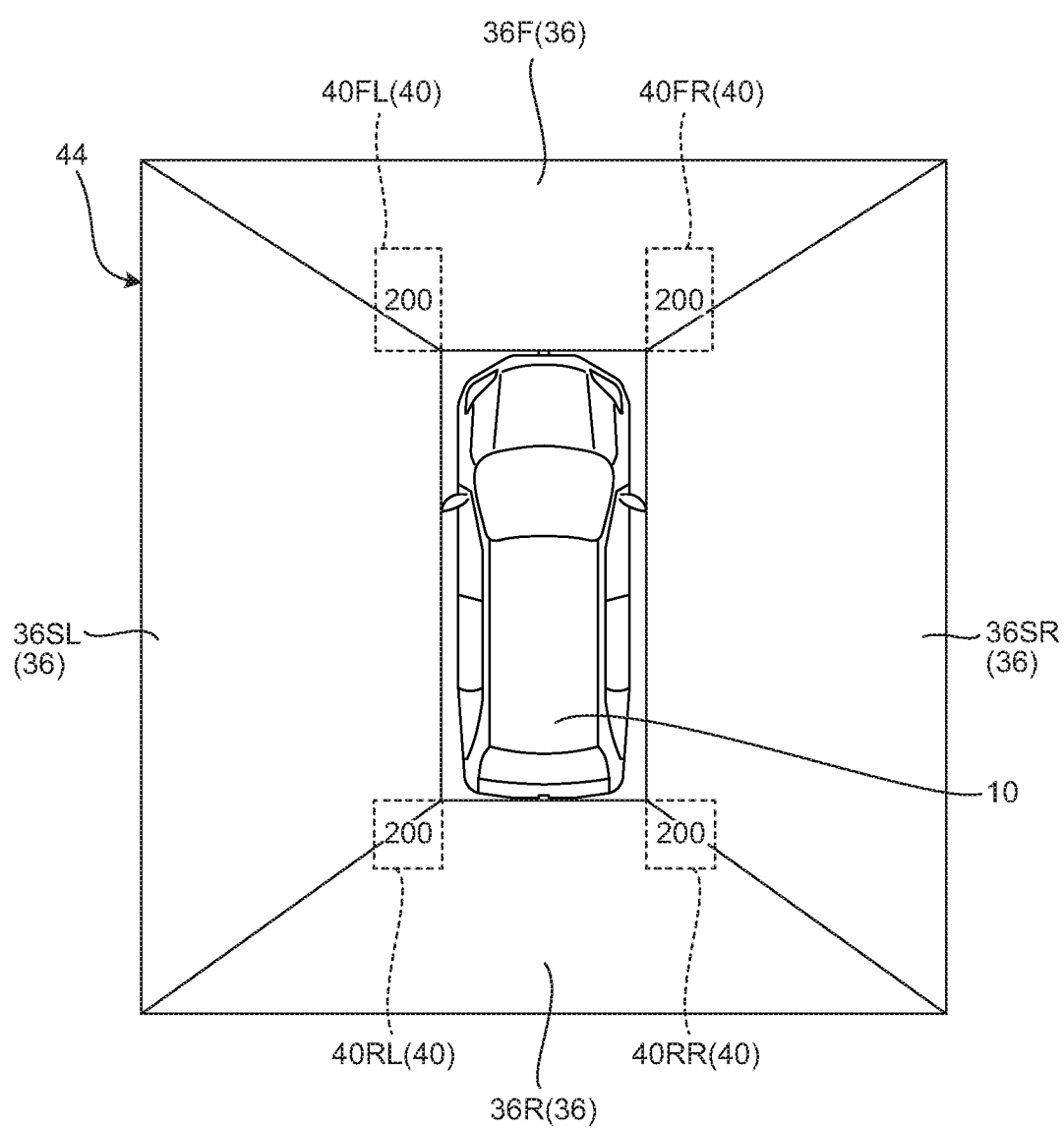
FIG. 10 is a schematic view of an exemplary luminance state of a surrounding image generated in a case where luminance correction is performed to the image-capturing regions around the vehicle.

When the correction processing is completed on all the images (images of the image-capturing region 36F, the image-capturing region 36R, the image-capturing region 36SL, and the image-capturing region 36SR) (Yes in S114), the CPU 24a causes the display control unit 24d to generate a bird's eye surrounding image connecting each image together and causes the display device 16 to display the bird's eye surrounding image (S116). The CPU 24a repeats the processing from S100 in the next processing cycle, to update the surrounding image. In this case, as illustrated in FIG. 10, the luminance of each region of interest 40 (40FL, 40RL, 40RR, and 40FR) is "200" in 256 levels, so that a surrounding image 44 can be generated in which the connection between each image-capturing region 36 (36F, 36SL, 36R, and 36SR) is smooth. Moreover, because the luminance between each region of interest 40 is corrected with the corresponding linear interpolation formula 42, any too bright part or any too dark part is inhibited from being generated, resulting in facilitation of recognition of the image content in any part of the surrounding image 44.

Figure 11:
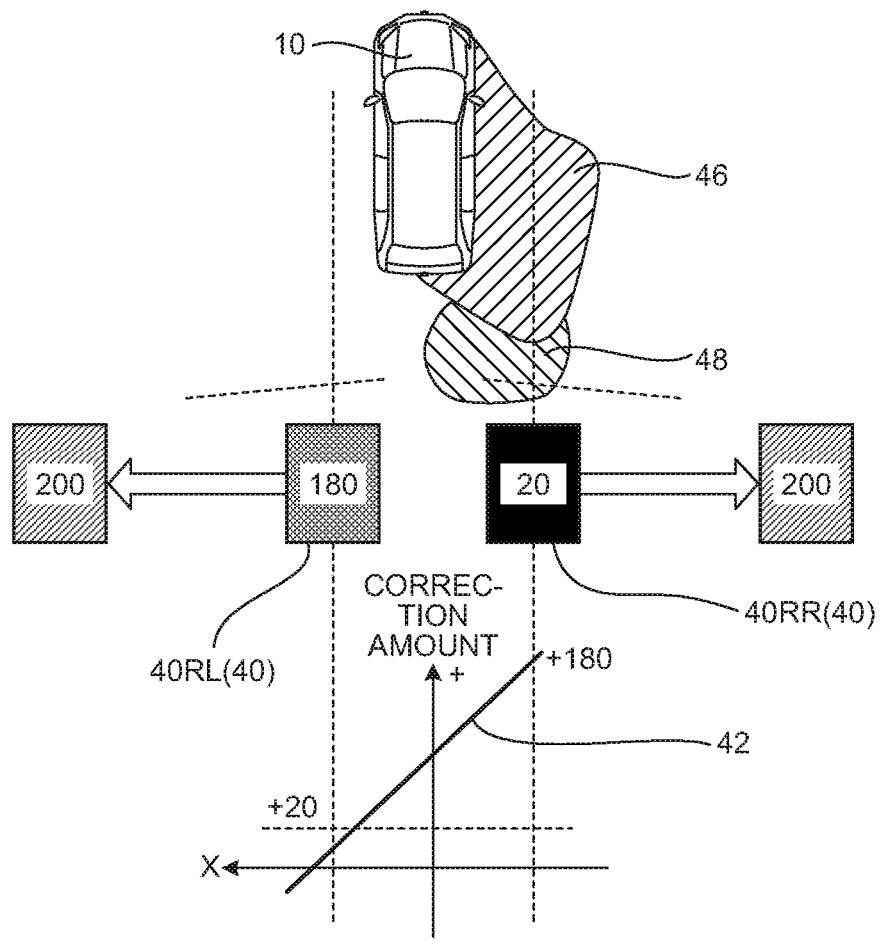
FIG. 11 is a schematic view of an exemplary too large gradient of a linear interpolation formula for use in luminance correction in the image processing apparatus according to the embodiment.
Figure 12:
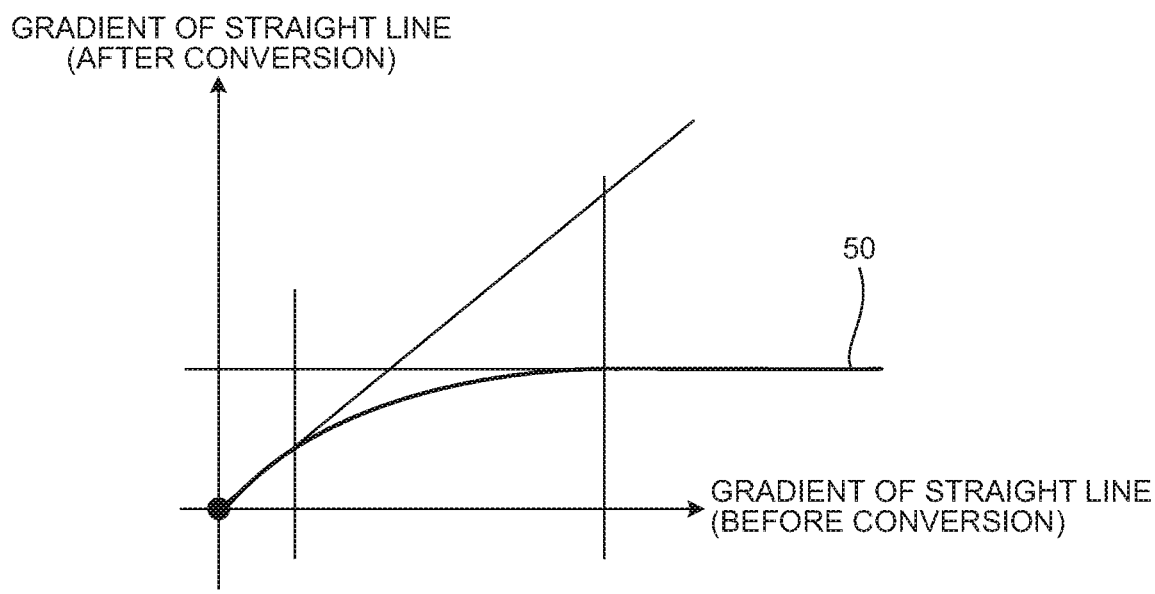
FIG. 12 is an explanatory schematic view of exemplary correction of the gradient of the linear interpolation formula of FIG. 11.

Here, in some cases, the difference in luminance between adjacent regions of interest 40 is originally large. For example, as illustrated in FIG. 11, in a case where sunlight is strong outdoors, in some cases, a dark shadow 46 of the host vehicle is present in a part around the vehicle 10. In this case, the difference in luminance between the luminance of the region of interest 40RL out of the shadow 46 (e.g., "180" in 256 levels) and the luminance of the region of interest 40RR included in the shadow 46 (e.g., "20" in 256 levels) is large in some cases. In such a case, similarly to the case described above, the fixed-value setting module 32a sets the target luminance to "200". Then, the correction value to the region of interest 40RL is "+20", whereas the correction value to the region of interest 40RR is "+180". As a result, as illustrated in FIG. 11, the linear interpolation module 34a generates a linear interpolation formula 42 having a large gradient in some cases when the linear interpolation module 34a generates the linear interpolation formula 42. In this case, a region 48 brighter than the region of interest 40RR around the region of interest 40RR is, in some cases, corrected brighter due to the influence of correction of the luminance of the region of interest 40RR. As a result, in some cases, so-called "halation" occurs in the region 48 brighter than the region of interest 40RR. Thus, the gradient setting module 34b corrects the gradient of the linear interpolation formula 42 generated by the linear interpolation module 34a, with a previously set curve 50 as illustrated in FIG. 12. For example, in a case where the gradient of the linear interpolation formula 42 is less than a predetermined limit value, the curve 50 causes no correction as the "normal zone". In a case where the gradient is the predetermined limit value or more, the curve 50 causes correction of reducing the gradient as the "limit zone". Moreover, in a case where the gradient is not less than a predetermined threshold limit value larger than the limit value, the curve 50 causes correction such that the gradient after correction is identical to a previously set predetermined value (fixed value).

In a case where the gradient of the linear interpolation formula 42 is the predetermined limit value or more, correction of the gradient with the curve 50 causes relaxation of luminance correction to the region 48 brighter than the region of interest 40RR, so that "halation" can be inhibited. Moreover, correction of the gradient with the threshold limit value (fixed value) enables inhibition of the luminance from increasing due to the gradient not less than the threshold limit value. Note that, in this case, a smooth luminance variation achieved due to the originally bright correction is restricted in correction. Thus, the luminance variation deteriorates in smoothness, but "halation" can be inhibited, resulting in an improvement in the recognition of image content. Note that the shape of the curve 50, the limit value, and the threshold limit value (fixed value) can be appropriately determined, for example, in consideration of the balance with the ambient luminance by experiment in advance. Moreover, the curve 50 may be calculated by the linear interpolation module 34a, for example, in consideration of the balance with the ambient luminance.

Figure 13:
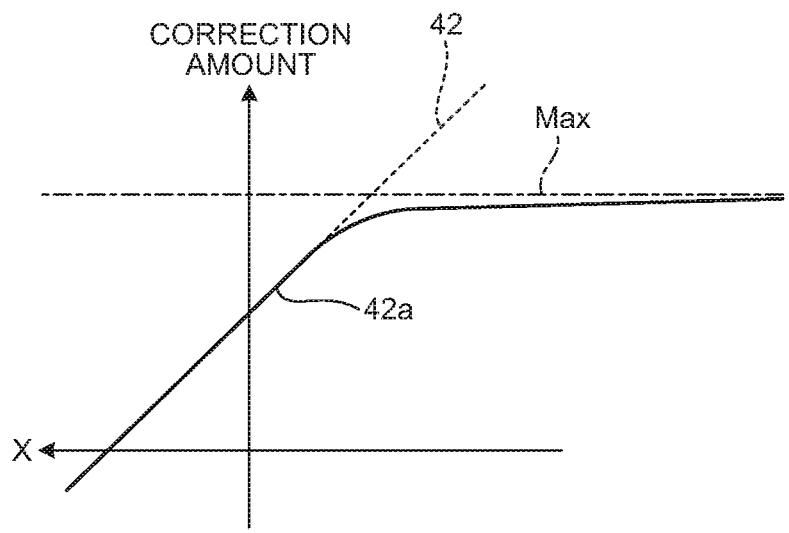
FIG. 13 is a schematic view of exemplary restriction based on a correction upper-limit value to a too large correction amount in luminance correction in the image processing apparatus according to the embodiment.

Moreover, in another embodiment, in a case where the luminance setting module 34d sets a correction value (individual correction value) for correction of the luminance of the region between the region of interest 40RL and the region of interest 40RR, on the basis of the linear interpolation formula 42, the luminance setting module 34d may apply a restriction to the correction value. For example, as illustrated in FIG. 13, a correction upper-limit value Max is set to the correction value. As the correction amount of the luminance increases in accordance with the linear interpolation formula 42, the individual correction amount to be set converges to the correction upper-limit value Max. In this case, luminance correction to the region 48 brighter than the region of interest 40RR is relaxed, so that "halation" can be inhibited. Note that the correction upper-limit value Max may be set as a fixed value in advance, or may be set in accordance with the gradient of the calculated linear interpolation formula 42.

Moreover, as described above, in a case where a linear interpolation formula 42 linearly connecting the respective correction values of adjacent two regions of interest 40 is generated on the basis of the target luminance set by the fixed-value setting module 32a or the like, luminance correction can be advantageously performed with no increase in processing load. On the other hand, depending on the correction values, in luminance correction to the intermediate part, a too small correction amount causes "black defects" in the image and conversely a too large correction amount causes "halation" in the image. Thus, according to the present embodiment, γ correction is used at the time of luminance correction. For example, the region of interest 40FL (first region of interest) and the region of interest 40FR (second region of interest) are considered in the image-capturing region 36F ahead of the vehicle 10. The luminance of the region of interest 40FL (average luminance in the region) is defined as "150" in 256 levels, and the luminance of the region of interest 40FR is defined as "100". The target luminance set by the fixed-value setting module 32a is defined as "125" in 256 levels. In this case, for achievement of the target luminance, the region of interest 40FL needs a correction value of "−25" and the region of interest 40FR needs a correction value of "+25".

Figure 14:
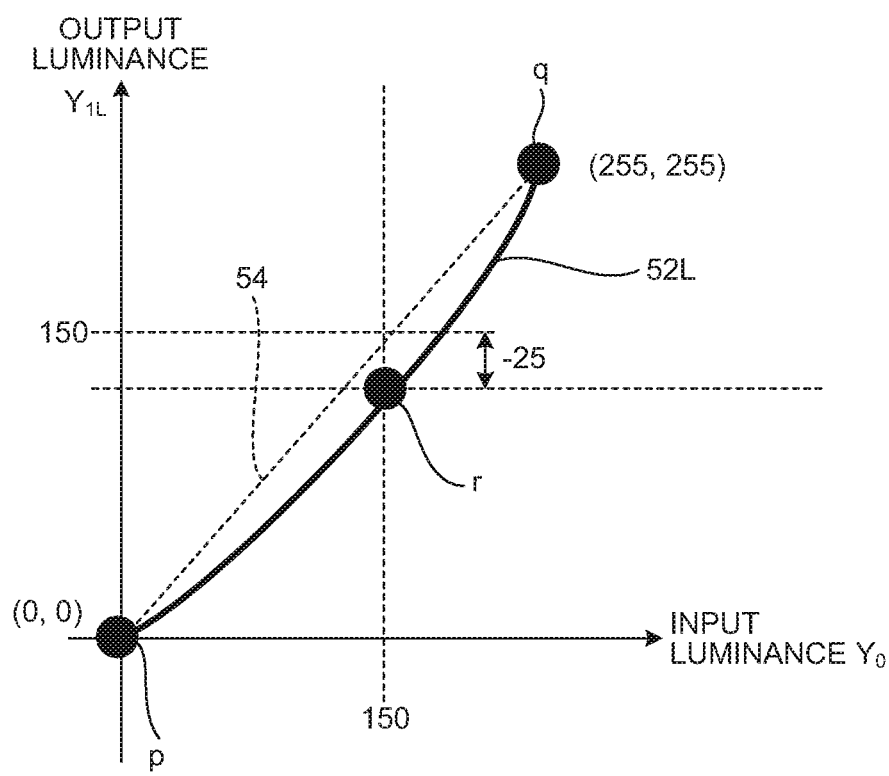
FIG. 14 is a schematic view of an exemplary relationship between input luminance and output luminance for describing linear interpolation in luminance with a coefficient of a γ curve.
Figure 15:
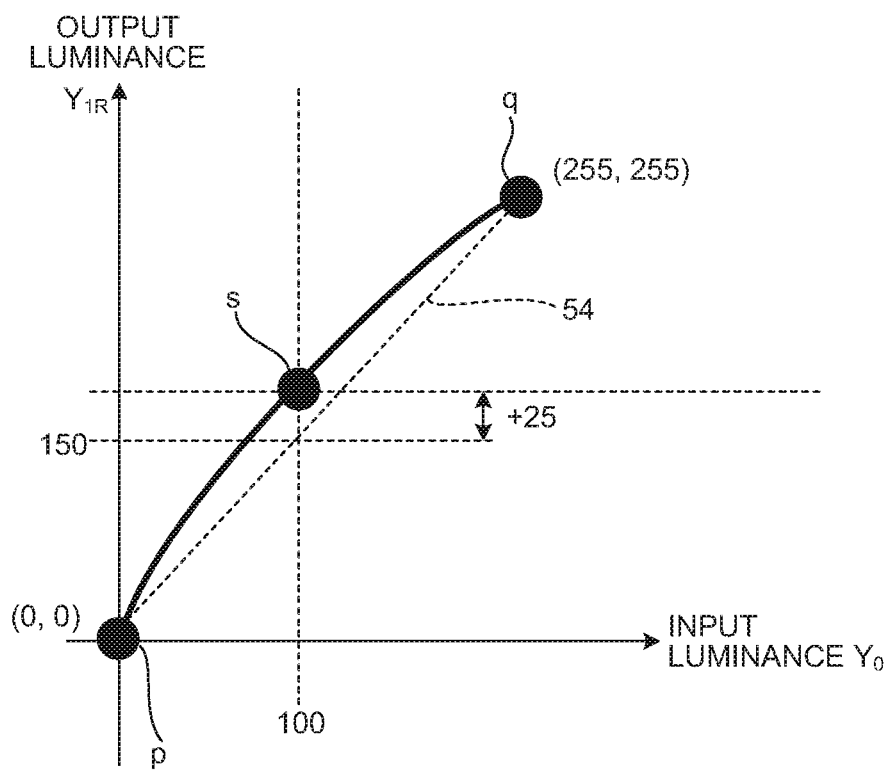
FIG. 15 is a schematic view of another exemplary relationship between input luminance and output luminance for describing linear interpolation in luminance with a coefficient of a γ curve.

Thus, as illustrated in FIG. 14, the γ-curve coefficient calculation module 34c calculates a first γ curve 52L for the region of interest 40FL, with the horizontal axis indicating input luminance $Y_0$ and the vertical axis indicating output luminance $Y_{1L}$. In this case, the γ-curve coefficient calculation module 34c calculates, as the first γ curve 52L, a curve $(Y_{1L}=Y_0^{1/\gamma 1})$ passing through three points at the coordinates p=(0, 0) of the minimum value (minimum luminance), the coordinates q=(255, 255) of the maximum value (maximum luminance), and the coordinates r at which the output luminance $Y_{1L}$ has "−25" to the input luminance $Y_0$. Then, the γ-curve coefficient calculation module 34c calculates "γ1" as a first coefficient. In this case, the first γ curve 52L is a downward convex curve to a straight line 54 satisfying the following expression: the output luminance $Y_{1L}$=the input luminance $Y_0$. Similarly, as illustrated in FIG. 15, the γ-curve coefficient calculation module 34c calculates, as a second γ curve 52R for the region of interest 40FR, a curve $(Y_{1R}=Y_0^{1/\gamma 2})$ passing through three points at the coordinates p=(0, 0) of the minimum value (minimum luminance), the coordinates q=(255, 255) of the maximum value (maximum luminance), and the coordinates s at which the output luminance $Y_{1R}$ has "+25" to the input luminance $Y_0$. Then, the γ-curve coefficient calculation module 34c calculates "γ2" as a second coefficient. In this case, the second γ curve 52R is an upward convex curve to a straight line 54 satisfying the following expression: the output luminance $Y_{1R}$=the input luminance $Y_0$.

Figure 16:
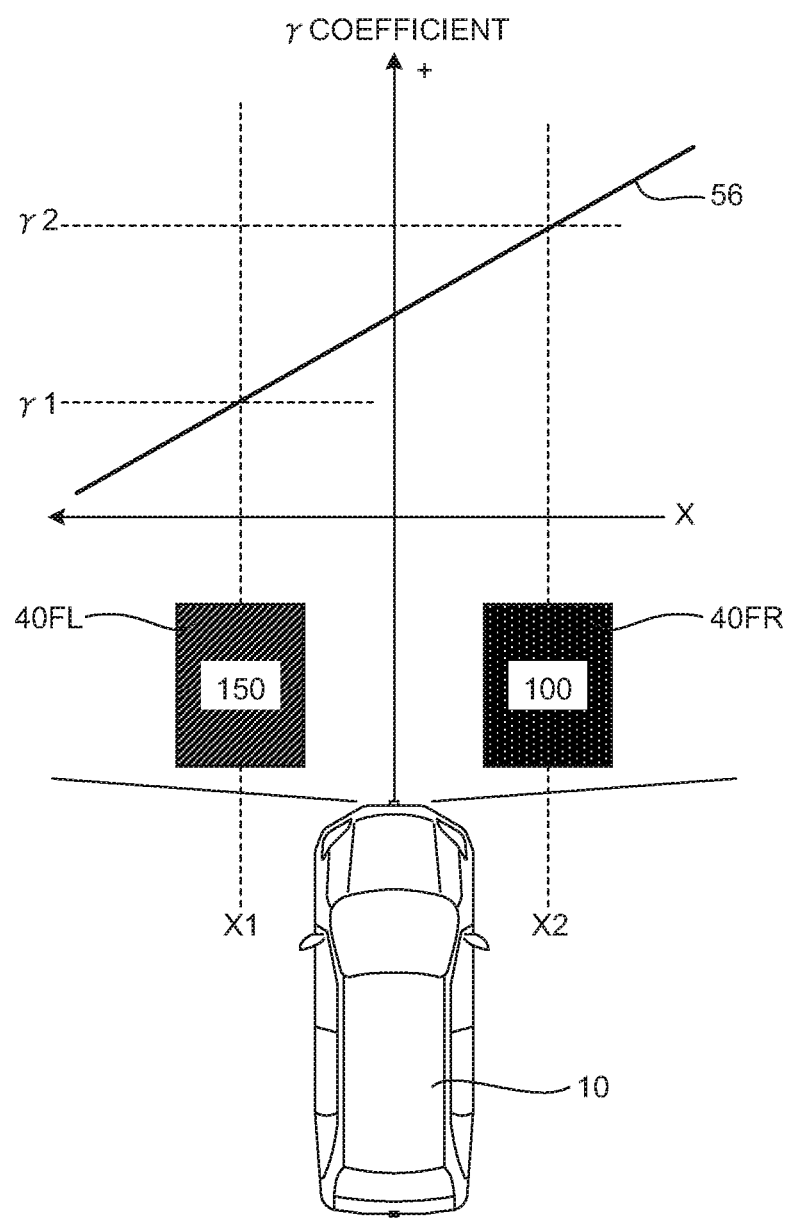
FIG. 16 is a schematic view of a linear interpolation formula generated with the coefficients of the γ curves of FIGS. 14 and 15.

The linear interpolation module 34a generates a linear interpolation formula 56, with the γ-curve coefficients γ1 and γ2 calculated by the γ-curve coefficient calculation module 34c. FIG. 16 illustrates the linear interpolation formula 56 (γ=aX+b) with the vertical axis indicating the γ-curve coefficient and the horizontal axis indicating the positional coordinate of the object to be corrected in luminance in the vehicular width direction, in which the γ-curve coefficient is "γ1" at X1 that is the central coordinate of the region of interest 40FL, and the γ-curve coefficient is "γ2" at X2 that is the central coordinate of the region of interest 40FR. Therefore, the luminance setting module 34d calculates a γ-curve coefficient corresponding to the position of the object to be corrected between the region of interest 40FL and the region of interest 40FR, on the basis of the linear interpolation formula 56. The luminance setting module 34d substitutes the calculated γ-curve coefficient and the luminance at the position of the object to be corrected (the luminance value of the original image, namely, the input luminance $Y_0$) into the following expression: $Y_1=Y_0^{1/\gamma}$ indicating the relationship between the input luminance $Y_0$ (luminance of the original image) and the output luminance $Y_1$. As a result, the corrected luminance (output luminance $Y_1$) of the region between the pair of regions of interest 40 can be calculated. Performance of such correction to the other images causes black defects (too dark correction) or halation (too bright correction) to barely occur in the images and enables inhibition of a lack of information. Thus, an easily-recognizable surrounding image can be generated.

Next, other exemplary processing of the image processing system 100 (image processing apparatus) will be described with the flowchart of FIG. 17 and FIGS. 18 to 20.

Figure 17:
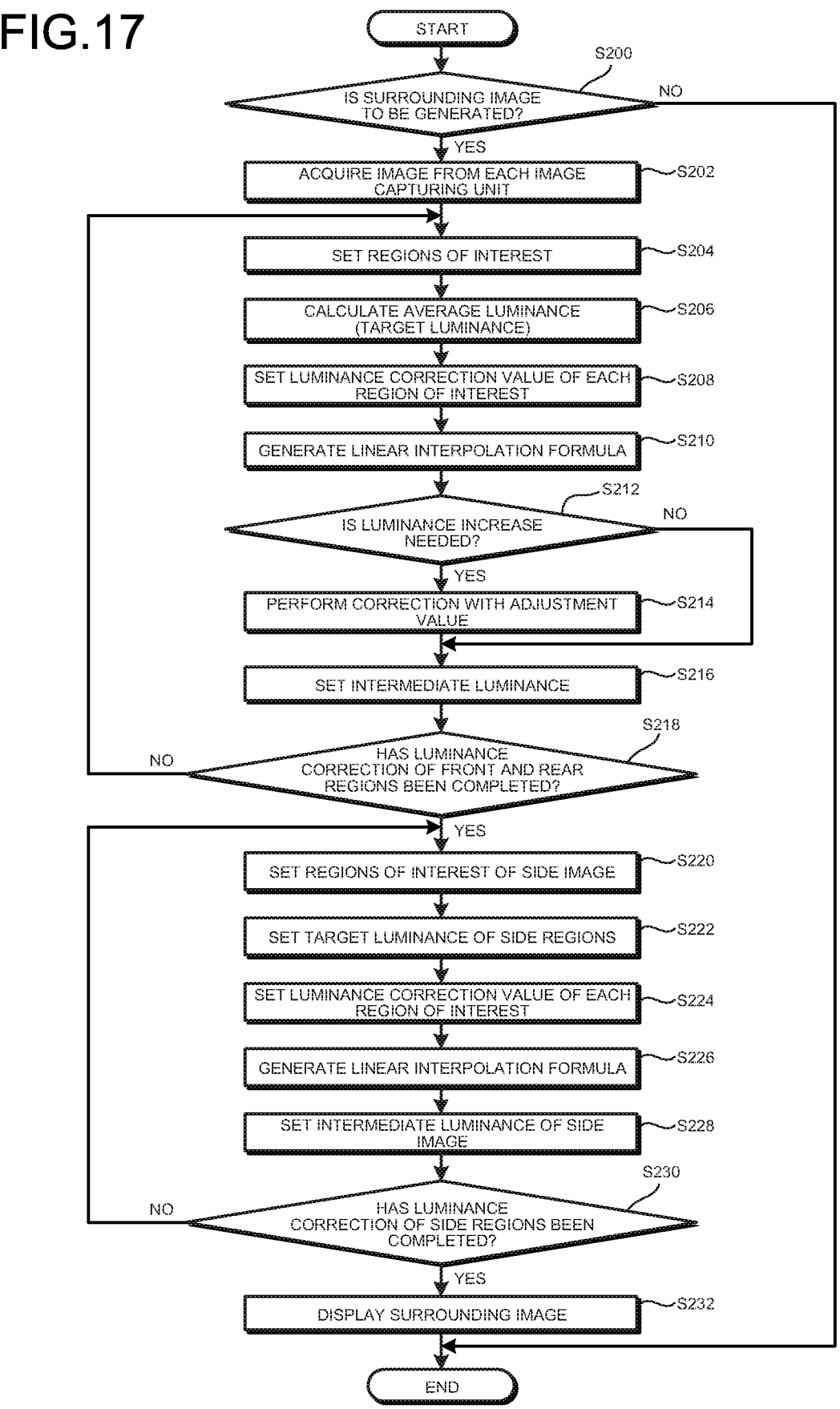
FIG. 17 is an explanatory flowchart of an exemplary flow of processing in a case where luminance correction is performed with correction of a linear interpolation formula (raising correction) with a predetermined value (fixed value), in the image processing apparatus according to the embodiment.

With the flowchart of FIG. 17, described will be a case where the fixed-value addition setting module 32b performs correction of a linear interpolation formula with a predetermined value and performs luminance correction (luminance-raising correction).

First, the CPU 24a determines whether the present time is the timing of generation of a bird's eye surrounding image based on the vehicle 10 (S200). The determination of the CPU 24a results in being affirmative, for example, on the basis of the operation state of the vehicle 10 (e.g., a case where the shift lever is moved to the position of reverse driving) or a display request operation from the driver through the operation input unit 20. In a case where the CPU 24a determines that the surrounding image is to be generated (Yes in S200), the acquisition module 28 acquires an image (image information) of the image-capturing region 36 captured by each image capturing unit 14 (S202). Note that, in a case where it is determined that the present time is not the timing of generation of the surrounding image (No in S200), the flow of FIG. 17 finishes temporarily.

Figure 18:
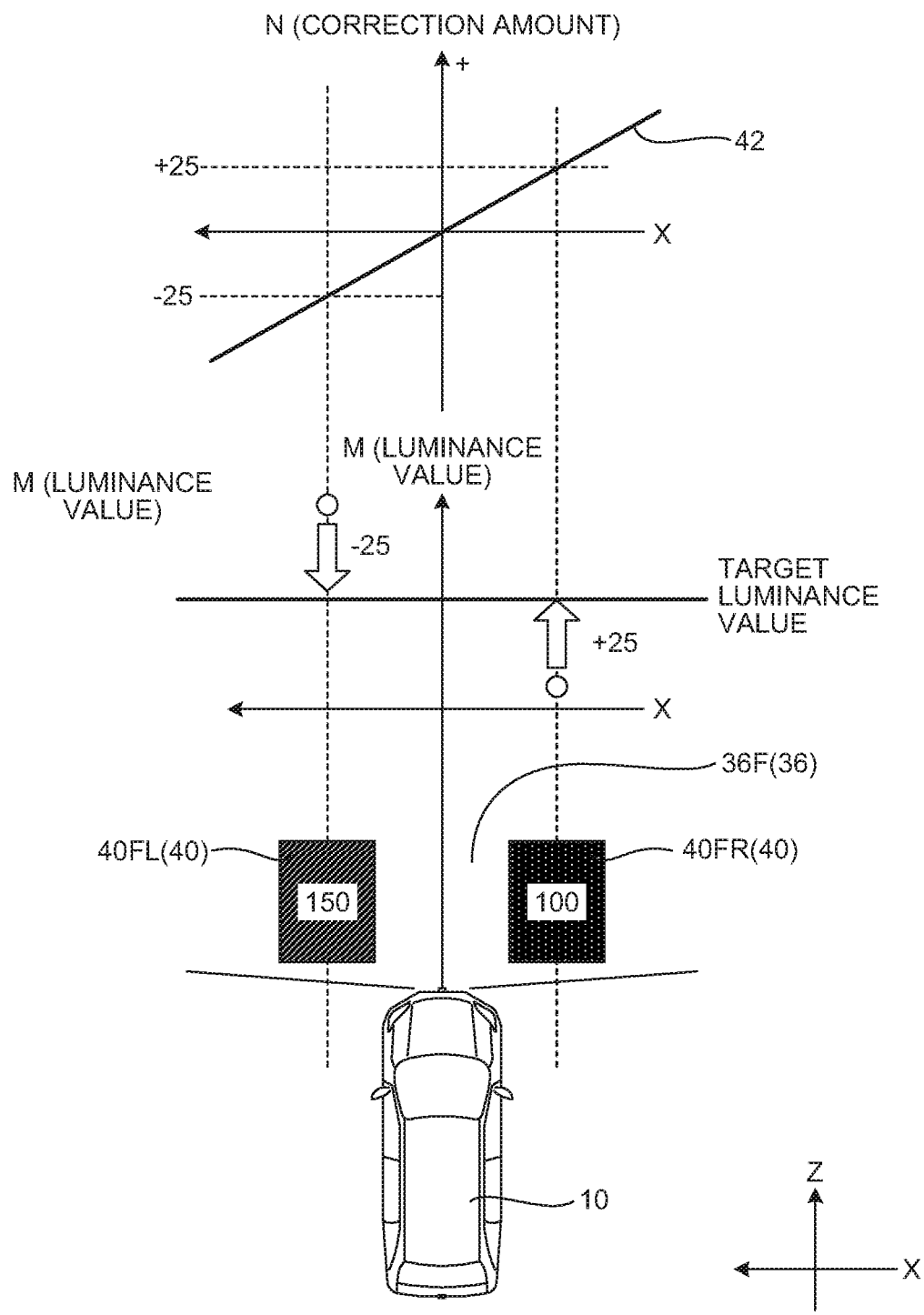
FIG. 18 is an explanatory view of an exemplary linear interpolation formula before correction at the time of the image processing in FIG. 17 and is an explanatory schematic view of a case where the target luminance of the regions of interest in the image-capturing region ahead of the vehicle is determined with the average value of a pair of regions of interest.

Subsequently, the region-of-interest setting module 30 sets regions of interest 40 to the image-capturing region 36 of each acquired image (S204). Subsequently, for example, for the image-capturing region 36F ahead of the vehicle 10, the fixed-value addition setting module 32b calculates the average value in luminance of the set two regions of interest 40 in the vehicular width direction (the region of interest 40FL and the region of interest 40FR) (average value in internal average luminance of the regions of interest 40), and sets the average value as the target luminance of the image-capturing region 36F (S206). For example, as illustrated in FIG. 18, the luminance of the region of interest 40FL on the left in the vehicular width direction (X-axis direction) of the image-capturing region 36F is "150" in 256 levels and the luminance of the region of interest 40FR on the right is "100" in 256 levels. In this case, the fixed-value addition setting module 32b sets "125" to the target luminance, and sets correction values for correction of the luminance of the region of interest 40FL and the luminance of the region of interest 40FR to the target luminance (e.g., "125") (S208). In FIG. 18, in the image-capturing region 36F, a correction value of "−25" as a luminance value M is set to the region of interest 40FL, and a correction value of "+25" as a luminance value M is set to the region of interest 40FR.

The linear interpolation module 34a generates a linear interpolation formula 42, with the correction value (N=−25) of the region of interest 40FL and the correction value (N=+25) of the region of interest 40FR set by the first setting module 32 (S210). As a result, the linear interpolation formula 42F indicates the correction amount of the luminance in the vehicular width direction (X-axis direction) between the region of interest 40FL and the region of interest 40FR.

Figure 19:
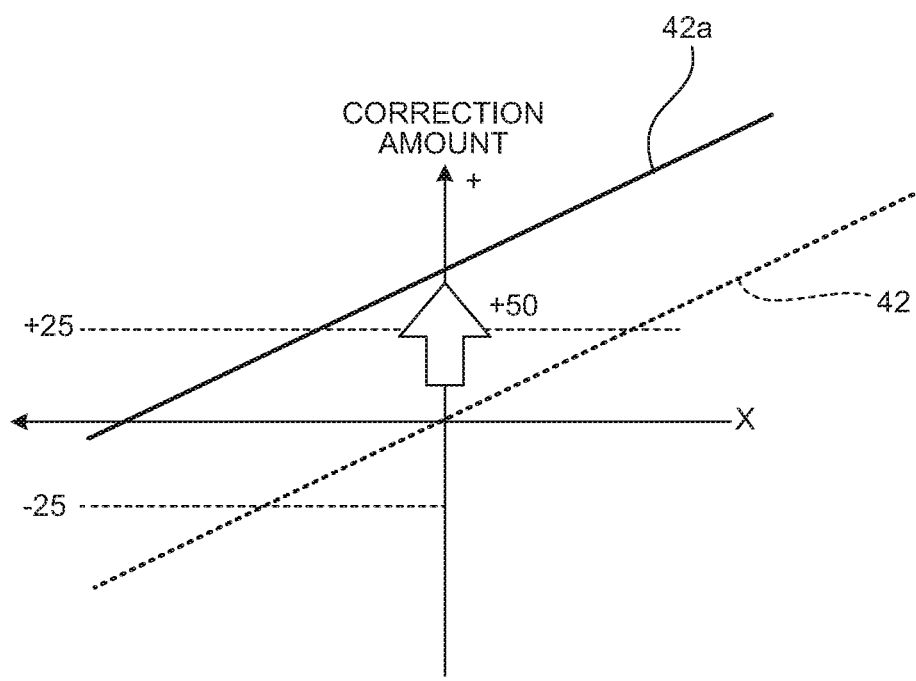
FIG. 19 is a schematic view of exemplary correction (raising correction) of the linear interpolation formula in FIG. 18 with a predetermined value (adjustment value).

Here, in the example, the target luminance is determined with the average value in luminance of the two regions of interest 40 (e.g., the region of interest 40FL and the region of interest 40FR) included in the image-capturing region 36 that is the object to be corrected, so that the linear interpolation formula 42 is generated. Thus, in some cases, the image after correction is not sufficiently bright although luminance correction processing is performed, namely, due to a too low target luminance. Thus, in a case where the fixed-value addition setting module 32b determines that increase adjustment is required because the luminance to be corrected with the linear interpolation formula 42 is lower than a previously set luminance (lower limit luminance) (Yes in S212), the fixed-value addition setting module 32b performs correction with a predetermined value (adjustment value) (S214). For example, a previously defined adjustment value (e.g., the adjustment luminance value=50) is added to the correction values set in S208. That is, as illustrated in FIG. 19, the adjustment luminance value=50 is added to the correction values ("−25" and "+25") for the target luminance (e.g., "125") determined with the average value of the luminance of the region of interest 40FL and the luminance of the region of interest 40FR. In other words, the linear interpolation formula 42 is directly shifted by a luminance value of +50 in the increasing direction, to generate a linear interpolation formula 42a. On the basis of the linear interpolation formula 42a, the luminance setting module 34d sets (corrects) the luminance of the region between the region of interest 40FL and the region of interest 40FR and the luminance of the region in the vehicular length direction (Z-axis direction) of the image-capturing region 36F, with similar correction amounts (S216). In this case, the luminance of the image-capturing region 36F rises uniformly by "+50", resulting in a bright image. Note that, in S212, in a case where the luminance to be corrected with the linear interpolation formula 42 is the previously set luminance (lower limit luminance) or more, it is determined that no increase adjustment is required (No in S212), so that the processing in S214 is skipped.

The first setting module 32 monitors whether or not luminance correction of the image-capturing region 36F ahead of the vehicle 10 and the image-capturing region 36R behind the vehicle 10 has been completed (S218). In a case where the luminance correction has not been completed (No in S218), the processing goes back to S204. Then, similar processing is performed. Meanwhile, in a case where the luminance correction of the image-capturing region 36F ahead of the vehicle 10 and the image-capturing region 36R behind the vehicle 10 has been completed (Yes in S218), the first setting module 32 sets regions of interest 40 for luminance correction of the image-capturing region 36SL and the image-capturing region 36SR lateral to the vehicle 10 (S220). Then, the first setting module 32 sets the luminance of the regions of interest 40 of the image-capturing region 36F and the image-capturing region 36R to which luminance correction has been completed, as the target luminance to the luminance of the regions of interest 40 of the image-capturing region 36SL and the image-capturing region 36SR (S222).

For example, as illustrated in FIG. 20, in a case where the luminance after correction of the region of interest 40FL in the image-capturing region 36F is "175" and the luminance before correction (at the time of capturing) of the region of interest 40FL of the image-capturing region 36SL is "100", the first setting module 32 sets the target luminance of the region of interest 40FL of the image-capturing region 36SL to "175" (S222). That is the first setting module 32 sets "+75" as the correction value to the region of interest 40FL of the image-capturing region 36SL (S224). Meanwhile, in a case where the luminance after correction of the region of interest 40RL in the image-capturing region 36R is "100" and the luminance before correction (at the time of capturing) of the region of interest 40RL of the image-capturing region 36SL is "50", the first setting module 32 sets the target luminance of the region of interest 40RL of the image-capturing region 36SL to "100" (S222). That is the correction value to the region of interest 40RL of the image-capturing region 36SL is "+50" (S224).

The linear interpolation module 34a generates a linear interpolation formula 42L, with the correction value (N=+75) of the region of interest 40FL and the correction value (N=+50) of the region of interest 40RL set by the first setting module 32 (S226). As a result, the linear interpolation formula 42L indicates the correction amount of the luminance in the vehicular length direction (Z-axis direction) between the region of interest 40FL and the region of interest 40RL. Then, on the basis of the linear interpolation formula 42L, the luminance setting module 34d sets (corrects) the luminance of the region between the region of interest 40FL and the region of interest 40RL and the luminance of the region in the vehicular width direction (X-axis direction) of the image-capturing region 36SL, with similar correction amounts (S228).

The first setting module 32 monitors whether or not luminance correction of the image-capturing region 36SL left lateral to the vehicle 10 and the image-capturing region 36SR right lateral to the vehicle 10 has been completed (S230). In a case where the luminance correction has not been completed (No in S230), the processing goes back to S220. A linear interpolation formula 42R regarding the image-capturing region 36SR is generated by similar processing, and right-side luminance correction processing is performed. Meanwhile, in a case where the luminance correction of the left-side image-capturing region 36SL and the right-side image-capturing region 36SR has been completed (Yes in S230), the CPU 24a causes the display control unit 24d to generate a bird's eye surrounding image connecting each image together and causes the display device 16 to display the bird's eye surrounding image (S232). The CPU 24a repeats the processing from S200 in the next processing cycle, to update the surrounding image. In this case, as illustrated in FIG. 20, the image-capturing region 36F and the image-capturing region 36SL each including the region of interest 40FL are connected smoothly with a luminance of "175". Similarly, the image-capturing region 36SL and the image-capturing region 36R each including the region of interest 40RL are connected smoothly with a luminance of "100". Moreover, the image-capturing region 36R and the image-capturing region 36SR each including the region of interest 40RR are connected smoothly with a luminance of "100". The image-capturing region 36SR and the image-capturing region 36F each including the region of interest 40FR are connected smoothly with a luminance of "175". That is the generated surrounding image is a natural and easily viewable image connecting each image smoothly with no difference in luminance at the connection between each image. Moreover, because the luminance between each region of interest 40 is corrected with the corresponding linear interpolation formula 42a, 42L, or 42R, any too bright part or any too dark part is inhibited from being generated, resulting in facilitation of recognition of the image content at any part in the surrounding image. Note that, as described above, correction of the gradient of a linear interpolation formula and calculation of a linear interpolation formula with a γ-curve coefficient can be applied to the processing of FIG. 17, so that similar effects can be acquired.

According to the embodiment described above, the target luminance set by the fixed-value setting module 32a and the adjustment value set by the fixed-value addition setting module 32b each have been described as a predetermined value regardless of the ambient condition of the vehicle 10. For example, the ambience of the display device 16 is dark at night. Thus, even when the entire luminance of the image displayed by the display device 16 drops, in some cases, the image content can be naturally recognized. Conversely, the ambience is bright in the daytime. Thus, in some cases, further enhancement in the luminance of the display device 16 facilitates recognition of image content. Therefore, in another embodiment, for example, the predetermined value may be changed in accordance with the state of the ambient brightness of the vehicle 10, such as day and night, or the brightness setting of the display device 16.

Moreover, according to the present embodiment, the image capturing unit 14b is fixed to the left door mirror 10b and the image capturing unit 14c is fixed to the right door mirror 10c. In this case, use of images captured with the vehicle 10 having the doors shut enables accurate connection with the respective images captured by the image capturing unit 14a and the image capturing unit 14d. Therefore, in a case where the doors are open, the display control unit 24d has difficulty in accurately connecting the images together. Thus, in a case where the doors are open, the CPU 24a may generate a reference surrounding image without luminance correction processing similar to the above.

The program for image processing that the CPU 24a executes, according to the present embodiment, may be recorded as a file in installable format or in executable format onto a computer-readable recording medium, such as a CD-ROM, a flexible disk (FD), a CD-R, or a digital versatile disk (DVD), for provision.

Furthermore, the image processing program may be stored on a computer connected to a network, such as the internet, and may be downloaded for provision through the network. Moreover, the image processing program that is executed in the present embodiment may be provided or distributed through a network, such as the Internet.

The embodiments and modifications according to the present invention have been described. The embodiments and modifications are just exemplary, and thus are not intended to limit the scope of the invention. The novel embodiments may be carried out in various other modes, and various omissions, replacements, or alterations may be made without departing from the gist of the invention. The embodiments and modifications are included in the scope or gist of the invention and are included in the invention in the claims and equivalents thereof.

The invention claimed is:

1. An image processing apparatus comprising:
a hardware processor configured to:
acquire a plurality of pieces of image information captured as a surrounding situation of a vehicle by a plurality of image capturing units provided at the vehicle, the plurality of pieces of image information including image-capturing regions overlapping partially;
set a first correction value and a second correction value with a predetermined value,
the first correction value being used for correction of luminance of a first region of interest including a part of a first overlap region in which a first image-capturing region overlaps a second image-capturing region, the first image-capturing region being one of a pair of image-capturing regions, of the image-capturing regions, spaced apart across the vehicle, the second image-capturing region being one of a pair of image-capturing regions, of the image-capturing regions, adjacent to the first image-capturing region, the first region of interest being smaller than the first overlap region, and
the second correction value being used for correction of luminance of a second region of interest including a part of a second overlap region in which the first image-capturing region overlaps a third image-capturing region, the third image-capturing region being another of the pair of image-capturing regions adjacent to the first image-capturing region, the second region of interest being smaller than the second overlap region; and
set an individual correction value with the first correction value and the second correction value, the individual correction value being used for correction of luminance of a region between the first region of interest and the second region of interest in the first image-capturing region.

2. The image processing apparatus according to claim 1, wherein the hardware processor is further configured to perform correction with the first correction value and the second correction value such that the luminance of the first region of interest and the luminance of the second region of interest arrive at a target luminance determined as the predetermined value.

3. The image processing apparatus according to claim 1, wherein the hardware processor is further configured to add an adjustment value determined as the predetermined value to the first and second correction values of the first and second regions of interest that are determined based on at least one of the luminance of the first region of interest and the luminance of the second region of interest.

4. The image processing apparatus according to claim 1, wherein, when the individual correction value is calculated based on an interpolation formula for linear interpolation between the first correction value and the second correction value, the hardware processor is further configured to reduce a gradient of the interpolation formula as the gradient increases.

5. The image processing apparatus according to claim 1, wherein the hardware processor is further configured to set a correction upper-limit value for the individual correction value and to set the individual correction value such that, along with an increase in a correction amount of luminance, the correction amount converges on the correction upper-limit value.

6. The image processing apparatus according to claim 1, wherein the hardware processor is further configured to set the individual correction value in accordance with a correction value calculated with a linear interpolation formula including the first correction value and the second correction value.

7. The image processing apparatus according to claim 1, wherein the hardware processor is further configured to set the individual correction value in accordance with a correction value calculated with a linear interpolation formula based on a first coefficient of a first γ curve calculated as a curve formula for a first target luminance with respect to the luminance of the first region of interest and a second coefficient of a second γ curve calculated as a curve formula for a second target luminance with respect to the luminance of the second region of interest.

8. The image processing apparatus according to claim 1, wherein each of the first region of interest and the second region of interest is set to include an outer circumferential portion of the vehicle.

* * * * *